(12) United States Patent
Bigio et al.

(10) Patent No.: US 10,551,207 B2
(45) Date of Patent: Feb. 4, 2020

(54) AUTONOMOUS VEHICLE SENSOR DATA AND MAP INTEGRATION

(71) Applicant: NIO USA, Inc., San Jose, CA (US)

(72) Inventors: Robin Bigio, San Francisco, CA (US); Daniel Paul Nacamuli, San Francisco, CA (US); Zachury B. Minjack, San Francisco, CA (US); Nicholas D. Hoppesch, Daly City, CA (US); Timothy J. Meador, Fairfield, CA (US); Pierluigi Dalla Rosa, Oakland, CA (US)

(73) Assignee: NIO USA, Inc., San Jose, CA (US)

( * ) Notice: Subject to any disclaimer, the term of this patent is extended or adjusted under 35 U.S.C. 154(b) by 24 days.

(21) Appl. No.: 16/011,197

(22) Filed: Jun. 18, 2018

(65) Prior Publication Data

US 2019/0383631 A1    Dec. 19, 2019

(51) Int. Cl.
| | |
|---|---|
| *G01C 21/36* | (2006.01) |
| *G09G 5/14* | (2006.01) |
| *G06F 3/0481* | (2013.01) |
| *G06T 11/60* | (2006.01) |

(52) U.S. Cl.
CPC ............ *G01C 21/367* (2013.01); *G06T 11/60* (2013.01); *G09G 5/14* (2013.01); *G06F 3/0481* (2013.01); *G09G 2340/04* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 7,412,326 | B2 * | 8/2008 | Yoshioka | G01C 21/367 340/990 |
| 9,092,987 | B2 | 7/2015 | Bone et al. | |
| 2011/0032119 | A1 | 2/2011 | Pfeiffer et al. | |
| 2016/0042238 | A1 * | 2/2016 | Lynam | B60Q 9/005 701/45 |
| 2018/0356641 | A1 * | 12/2018 | Morohashi | B60K 35/00 |

\* cited by examiner

*Primary Examiner* — Yanna Wu
(74) *Attorney, Agent, or Firm* — Sheridan Ross P.C.

(57) ABSTRACT

Methods and system of rendering a combined display including map and detected objects in environment surrounding a vehicle are provided. A display device or user interface combines active driver assist systems information and guidance data into one presentation of information that is overlaid onto a map. When a vehicle is in manual mode a user can easily and conveniently monitor all relevant driving data via the display device. A vehicle processor may receive map information from a navigation system and object data from vehicle sensors and systems monitoring an environment around a vehicle. This information may be fused together to form an integrated map presentation to be rendered to a display device associated with the vehicle. The map may be shown on an arrangement of multiple-plane surfaces that can resize and reshape to automatically and selectively enhance a level of detail in the presentation.

15 Claims, 22 Drawing Sheets

AUTONOMOUS VEHICLE SENSOR DATA AND MAP INTEGRATION

FIELD

The present disclosure is generally directed to vehicle systems, in particular, toward vehicle navigational displays and systems.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
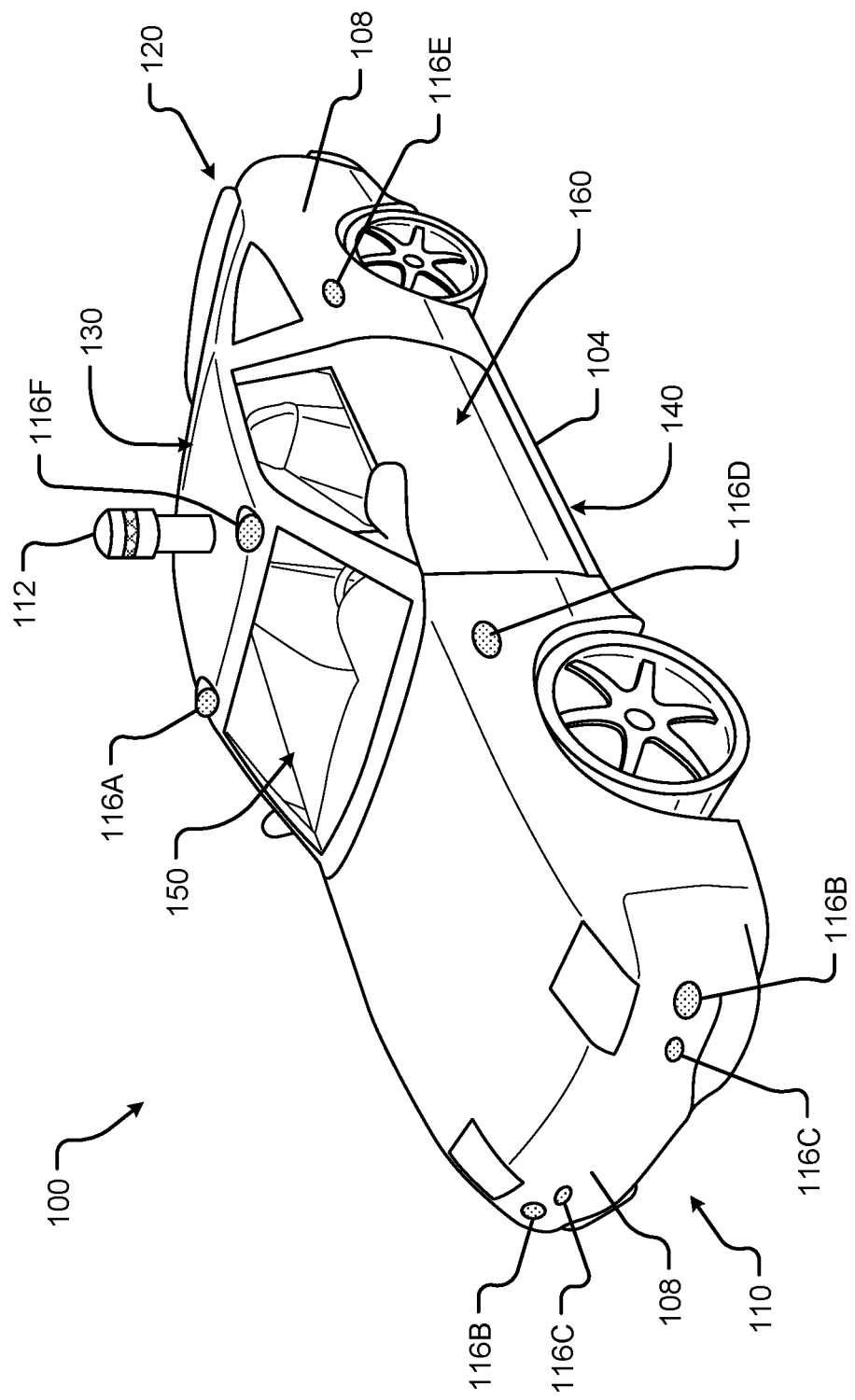
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
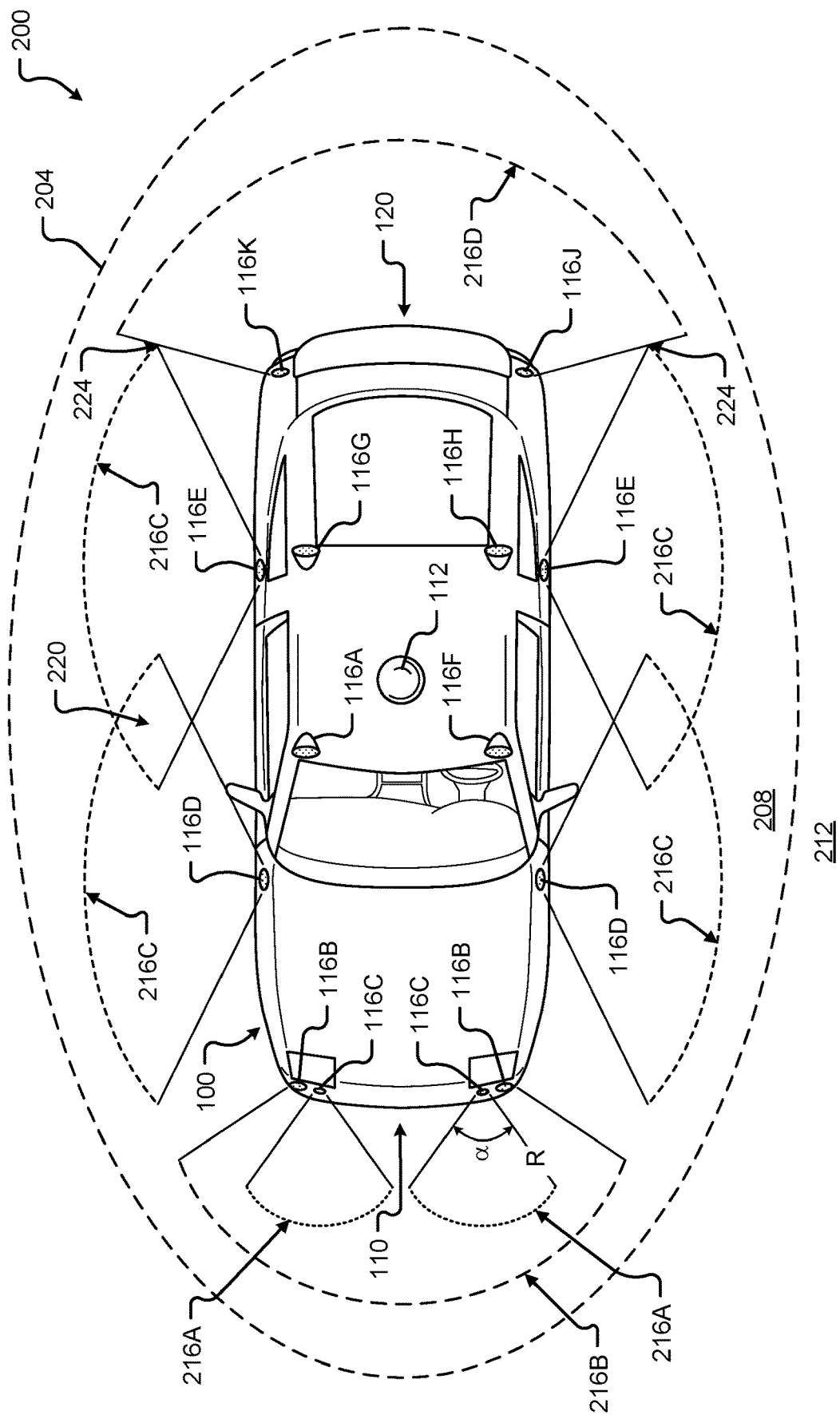
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
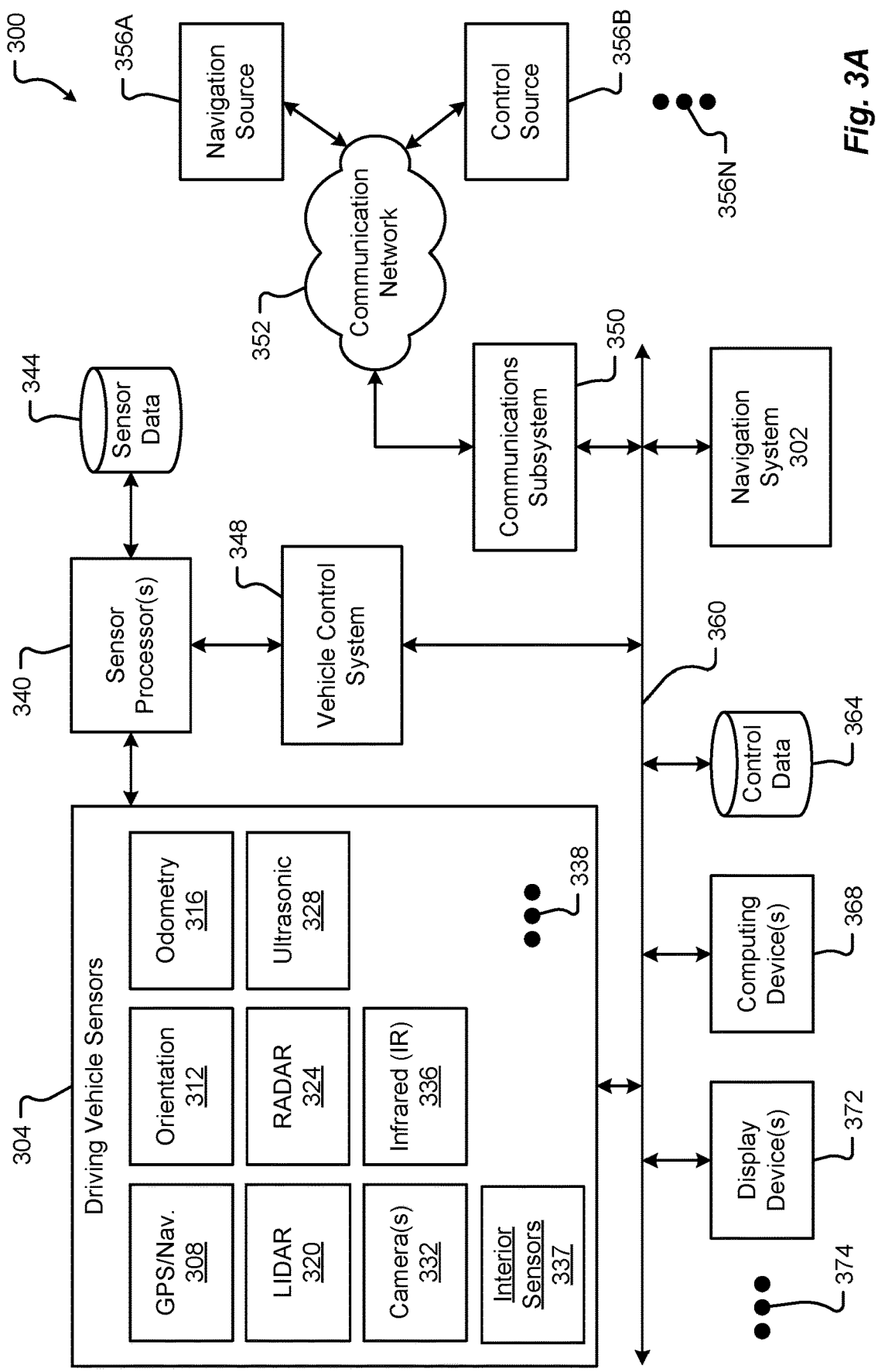
FIG. 3A is a block diagram of an embodiment of a communication environment of the vehicle in accordance with embodiments of the present disclosure.
Figure 3B:
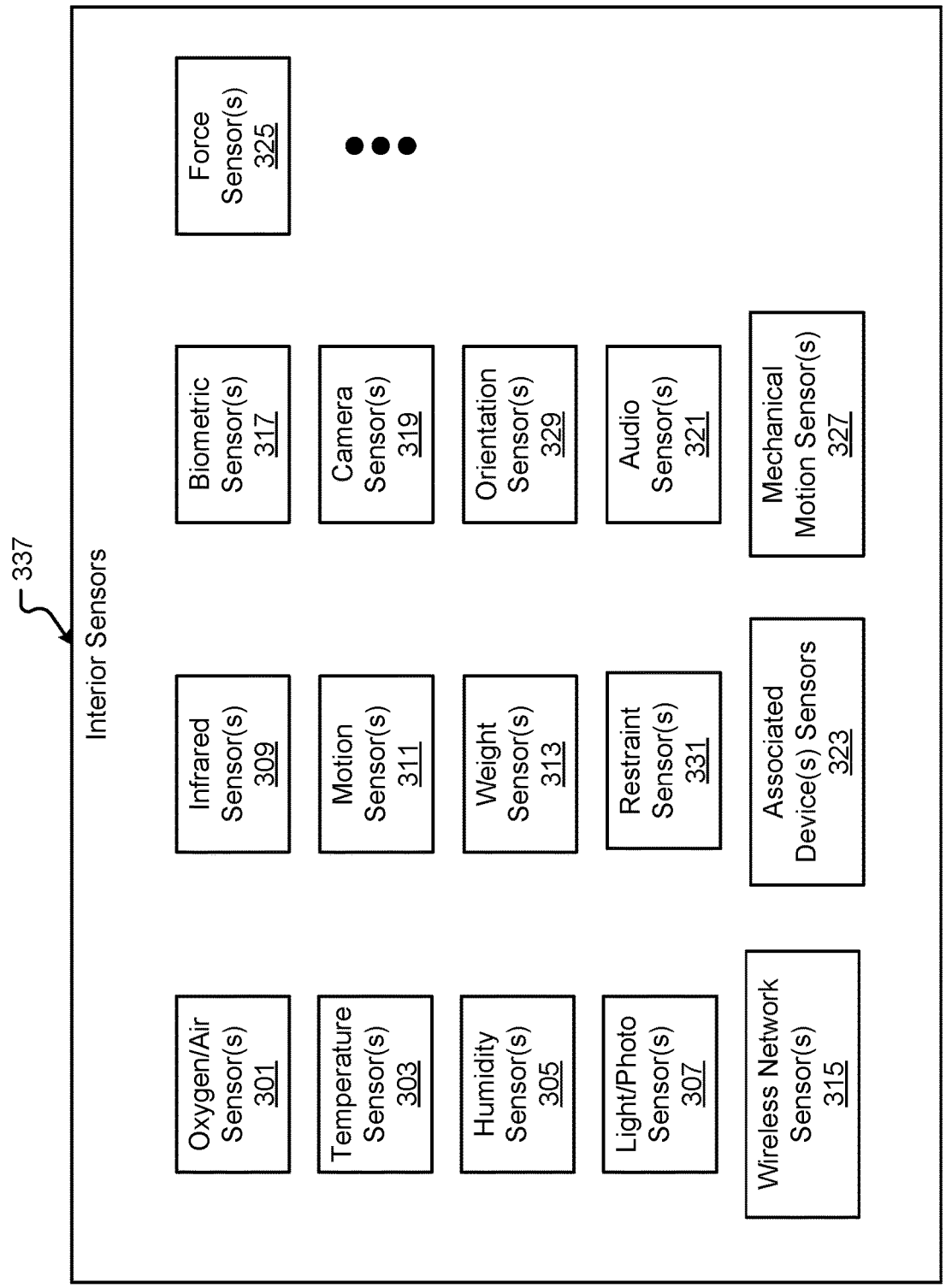
FIG. 3B is a block diagram of an embodiment of interior sensors within the vehicle in accordance with embodiments of the present disclosure.
Figure 3C:
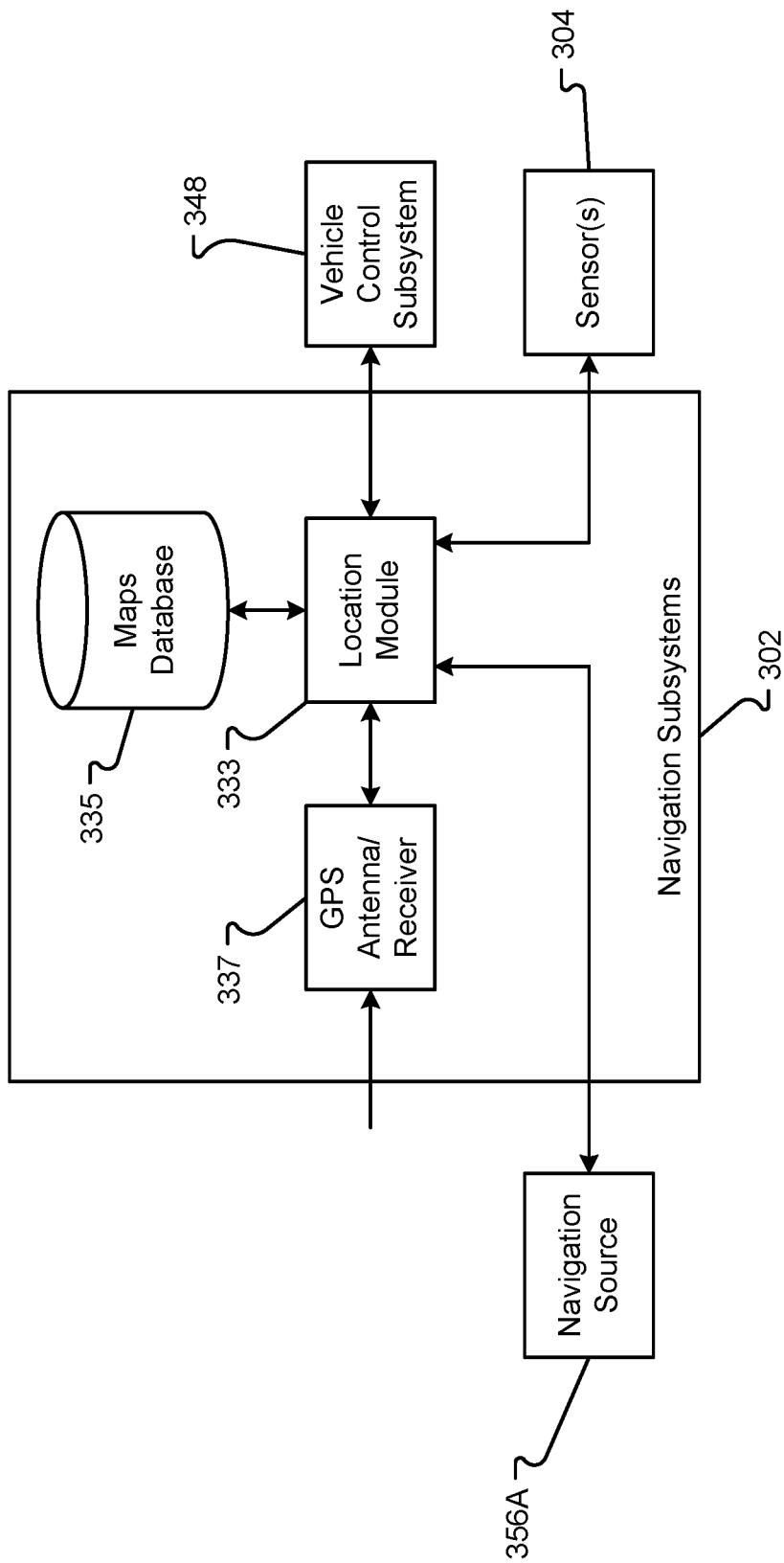
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, interior sensor 337, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, which may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 100. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, first audio sensors 321 may be located in a first area of the vehicle 100 and second audio sensors 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS antenna/receiver 337, a location module 333, a maps database 335, etc. Generally, the several components or modules 333-337 may be hardware, software, firmware, computer readable media, or combinations thereof.

A GPS antenna/receiver 337 can be any antenna, GPS puck, and/or receiver capable of receiving signals from a GPS satellite or other navigation system. The signals may be demodulated, converted, interpreted, etc. by the GPS antenna/receiver 337 and provided to the location module 333. Thus, the GPS antenna/receiver 337 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS antenna/receiver 337, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control subsystem 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long-range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control subsystem 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red tights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 4:
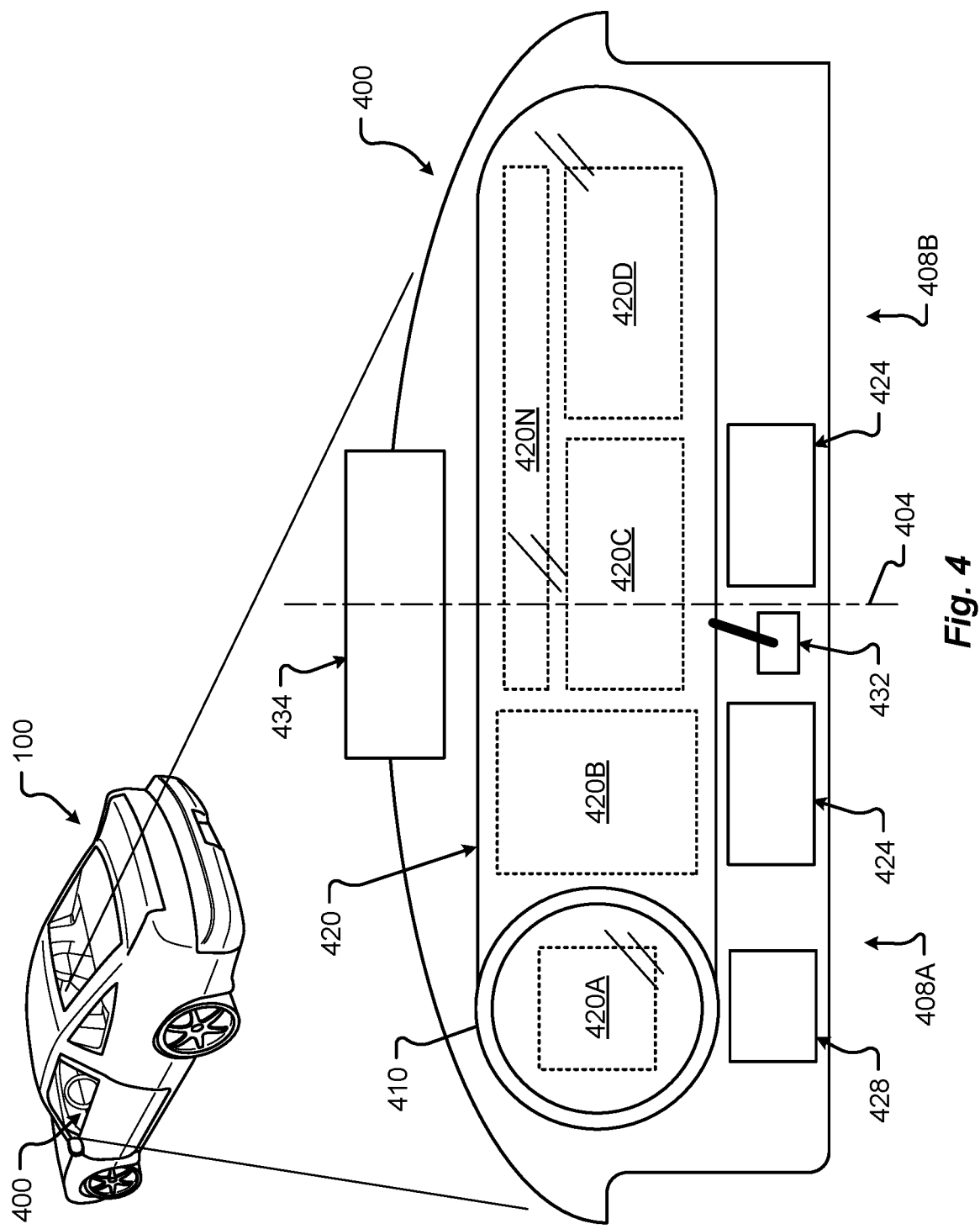
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
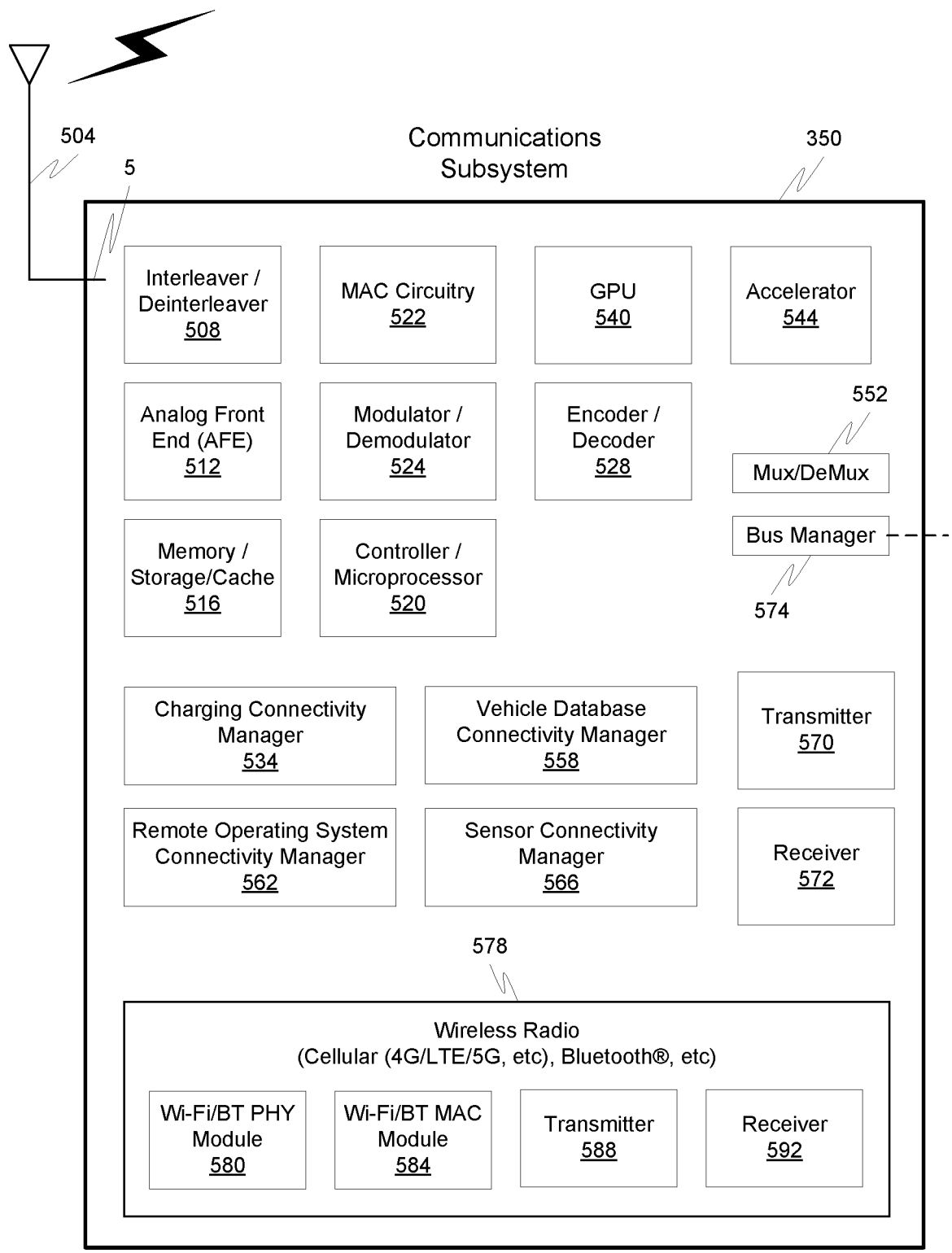
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
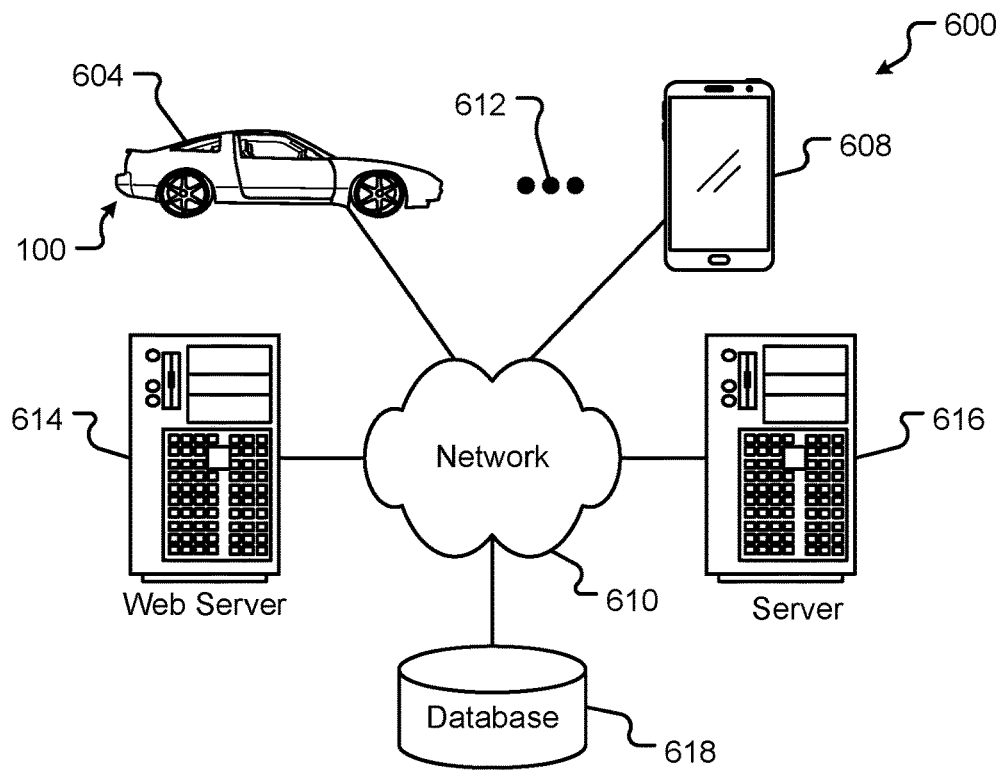
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 610 and/or displaying and navigating web pages or other types of electronic documents or information. In some embodiments, the network 610 may correspond to the communication network 352 described in conjunction with FIG. 3A. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 610) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
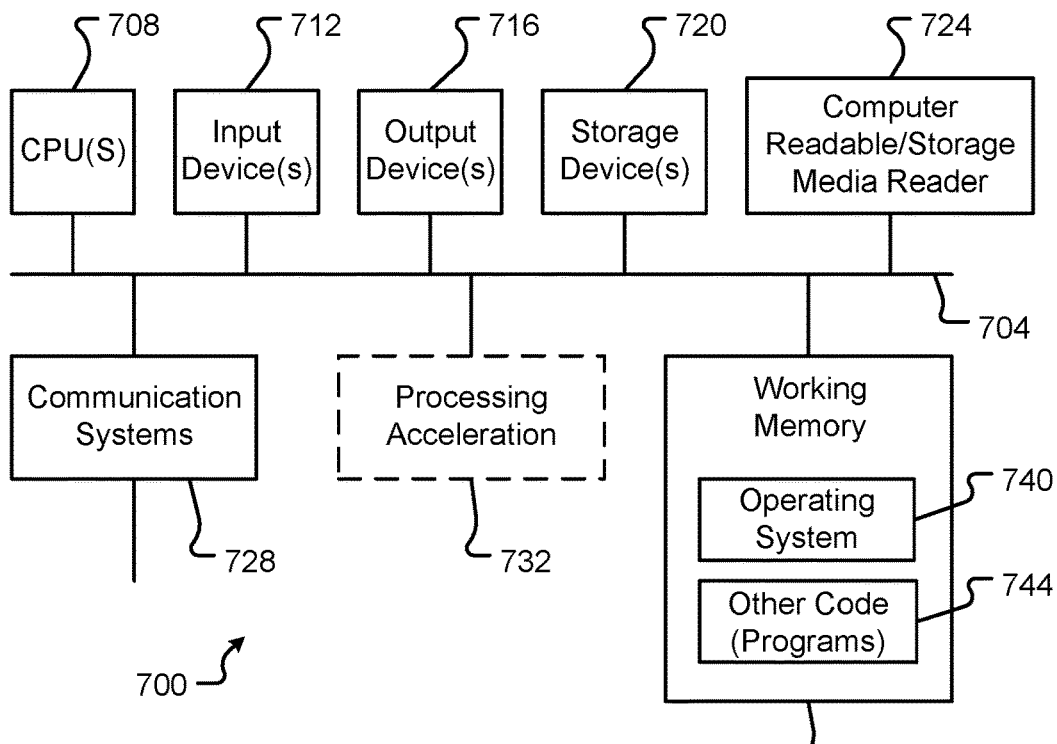
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In some embodiments, a user interface and/or display device is described that combines the active driver assist systems information into one interface that may be overlaid onto a map. The map may include a multiple-plane surface for rendering object and map information. One or more planar portions of the multiple-plane surface may be resized to enhance a viewability of objects and/or map data rendered to the map display. In some embodiments, when a user is driving a vehicle 100 in manual mode the combined information display allows the user to easily and conveniently monitor all the data in an environment of the vehicle 100 to ensure they are driving in the safest manner possible. In one embodiment, the overlay of information onto the map may be color-coded to show the pertinent information such as what lanes are open around the vehicle, dangers, risk areas, and/or other such information.

Additionally or alternatively, the present disclosure utilizes a number of active driver assist systems to render a simplified representation of information that is overlaid onto a map in a clear single user interface presentation. Moreover, the present disclosure combines map and route information with vehicle spatial data to provide enhanced directions and/or driving guidance to a user via a display device associated with the vehicle 100.

The visualization of map information may provide map data, turn-by-turn directions and guidance, optimal lane determination, and/or an occupancy grid of the roads and/or paths in proximity to the vehicle 100. The visualization (e.g., bend angle presentation and scale, etc.) may be changed based on speed of the vehicle 100, distance of the vehicle 100 from one or more turns in a trip, a change of lane that is required, and/or change lane advice provided by a driving and map integration engine or visualization system.

The autonomous system of the vehicle 100 may perform a sensor fusion of lidar, radar and camera vision creating an occupancy grid of the road nearby as well as an accurate location of the vehicle 100. The data platform and digital mobility may be providing map data, turn-by-turn directions and an optimal lane path, etc. This information may be fed to the visualization system. The visualization system can be a component of the vehicle interface that provides visual and auditory content in an interior of the vehicle 100. The visualization system may be configured to display a map having the capability of taking a number of inputs (e.g., from sensor data, navigation sources, etc.) and recreating a three-dimensional (3D) representation of the world that includes lane guidance, turn-by-turn directions, advanced driver-assistance systems information and map data. The map generated may bend at an angle on the parallel axis to the travelling motion of the vehicle 100 to allow the sight of further turns, obstacles, and/or objects that otherwise would not be possible on a traditional, flat map.

The lane guidance may be connected with the visualization of the nearby occupancy grid. The occupancy grid may represent a map of the environment as an evenly spaced field of binary random variables each representing the presence of an obstacle at that location in the environment. In some embodiments, a lane change may be suggested only when the desired, or target, lane is free from other vehicles to enhance safety of operation.

Figure 8:
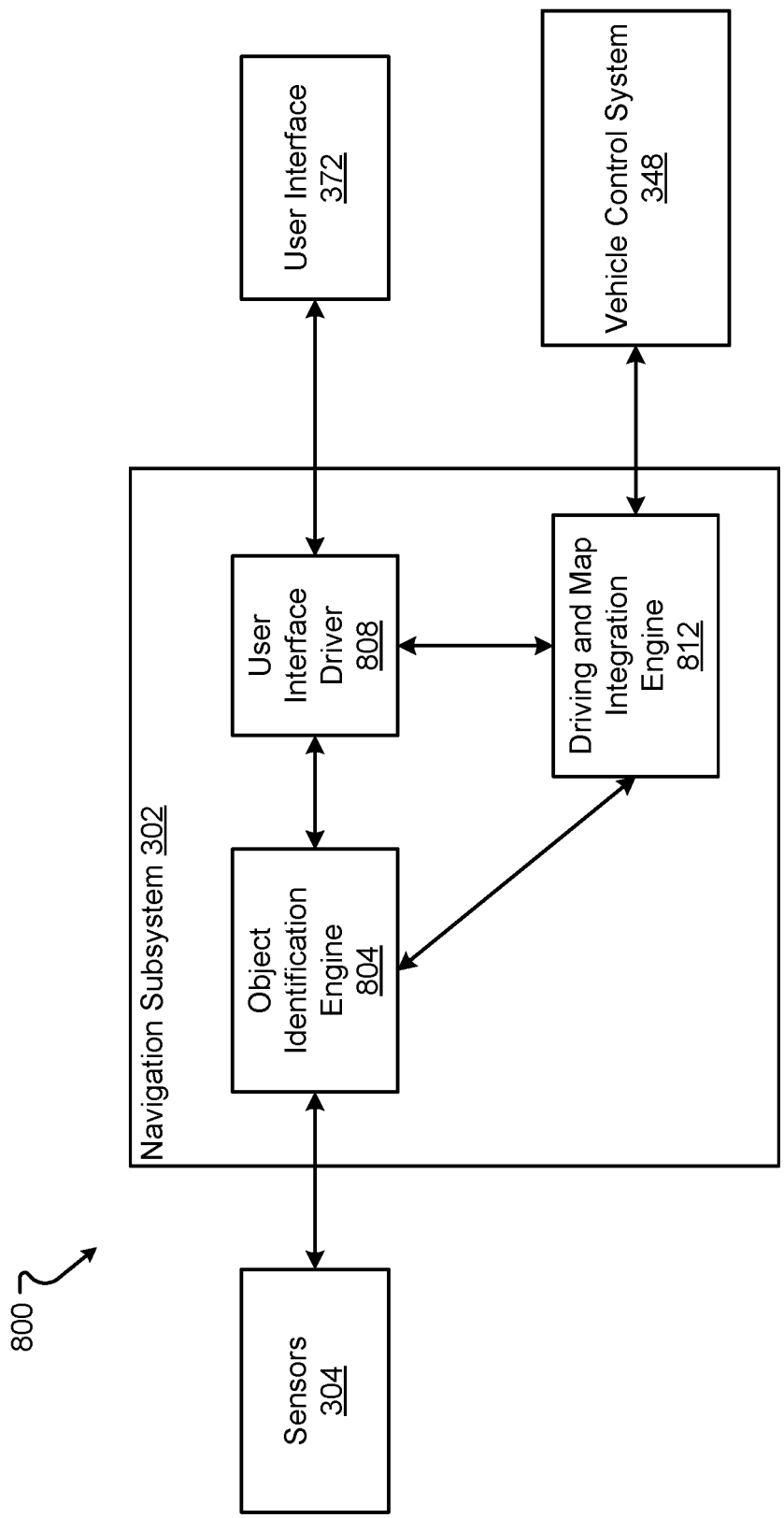
FIG. 8 is a block diagram of an autonomous vehicle sensor data and map integration system according to embodiments of the present disclosure.

Referring to FIG. 8, an embodiment of a software and/or hardware system 800 that may be part of the navigation subsystem 302, as described herein, and/or executed as part of the CPU 708 or may be embodied in an application specific integrated circuit (ASIC), a system-on-chip (SoC), field programmable gate array (FPGA), or other type of hardware device may be as shown in FIG. 12. The system 800 can include one or more different components that can be in communication with the vehicle control system 348 as described herein. As such, the vehicle control system 348 can receive the information and/or directives from the different components 804, 808, 812 to control the vehicle 100, determine map display presentations, render multiple-plane map information to a display device 372 of the vehicle, and/or alter map display presentations rendered to the display device 372 of the vehicle. The different components can include one or more of, but are not limited to, an object identification engine 804, a user interface driver 808, and/or a driving and map integration engine 812.

The object identification engine 804 can be a processing component that creates and outputs the data structures described herein that identify and track the movement of one or more objects, for example, other vehicles, animals, obstacles, etc. Thus, the object identification engine 804 can receive data from the one or more sensors 304 and identify the objects in the environment 204. This object information may then be stored in data structures, as described in conjunction with FIGS. 9A-9B. This information may then be provided to the driving and map integration engine 812 and/or the user interface driver 808 for rendering to the user interface 372, etc.

The user interface driver 808 may be a processing component of the system 800 that controls one or more display devices 372 associated with the vehicle 100. For instance, the user interface driver 808 may receive data from the object identification engine 804 and/or the driving and map integration engine 812 and control one or more of the display devices 372 to render the information to a user of the vehicle 100. As described herein, this information may include combined data from a number of sources including, but in no way limited to, a navigation source 356A, a control source 356B, vehicle sensors and systems 304, map data, other data sources, and/or combinations thereof. In some embodiments, the user interface driver 808 may communicate with the components of the system 800 and/or the vehicle 100 over a bus 360 or other communication network.

The driving and map integration engine 812 can be a processing component of the system 800 that creates and outputs the data structures described herein that provide trip and map guidance, driving display presentations, vehicle control information/instructions, and/or changes thereto. In some embodiments, the driving and map integration engine 812 can receive data from the object identification engine 804 and/or the one or more sensors 304 and determine a combined, or integrated, map display presentation based on the same. This information may be stored in data structures, as described in conjunction with FIGS. 9C-9D. The driving and map integration engine 812 can receive the information provided from the object identification engine 804 and/or the vehicle sensors and systems 304 to determine a location of objects relative to the vehicle 100 as well as relative to map features, which can be stored in the data structures 956, 986 described in conjunction with FIGS. 9C-9D. The information processed by the driving and map integration engine 812 may be used to determine an angle of map display planes, or bend angle, for the presentation of map data to a display device 372 associated with the vehicle 100. In some cases, this information may be provided to the vehicle control system 348 to use in controlling the vehicle 100 to autonomously, or semi-autonomously, maneuver along a path.

Figure 9A:
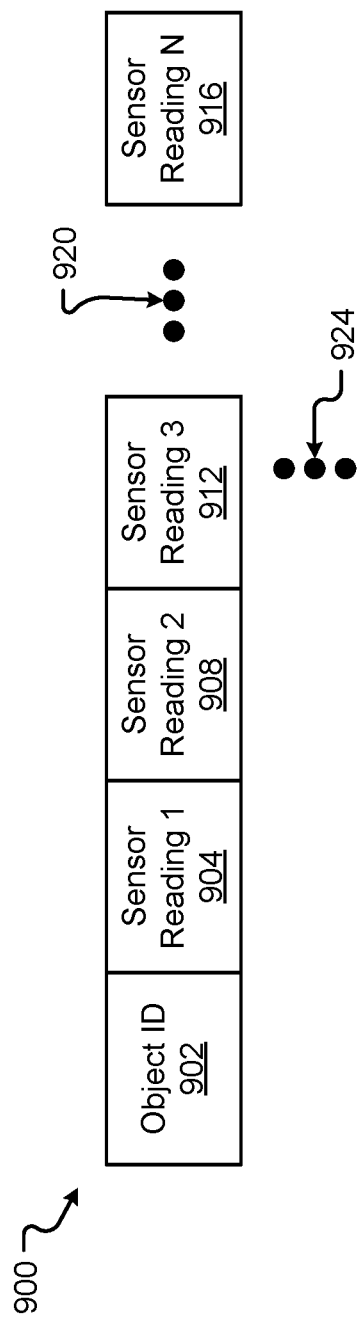
FIG. 9A is a data diagram of sensor measurements associated with an object in the driving environment according to embodiments of the present disclosure.

An embodiment of a data structure 900 representing sensor measurements associated with an object may be as shown in FIG. 9A. The data structure 900 can include one or more of, but is not limited to, an object identifier (ID) 902 and one or more sensor readings 904-916. There may be more or fewer data elements in the data structure 900, as represented by ellipsis 920. Further, there may be a data structure 900 for each object in the environment 200 and thus there may be more than a single data structure 900, as represented by ellipses 924.

The object identifier (ID) 902 can be any type of identifier that uniquely identifies the object from all other objects in the environment 200. Thus, the object ID 902 can be a numeric, alphanumeric, globally unique identifier (GUID), etc. The object ID 902 can also be information that helps identify the object, for example, biometric data, visual data, audio data, a voiceprint, a radio frequency identifier (RFID) or other types of tags or transceivers, a cell phone, device identification, etc. that can be used to identify the object in the environment 200. Further, the object ID 902 can include any pointer or reference to another data structure, e.g., data structure 928, to call or retrieve other data about the object.

The sensor measurements 904, 908, 912, 916 represent one or more sensor measurements, such as those discussed above. Each measurement 904-916 can be associated with a time. The times may be based on a first measurement time and additional times from the measurement time of the first sensor reading 904. For example, the sensor readings 908-916 may refer to measurements made by the vehicle sensors and systems 304 at times measured from one or more time intervals from the first sensor reading 904. As such, the measurements 904-916 may represent a series of measurements of an object over a time period that is separated into defined time portions. These sensor readings 904-916 can include any information that can identify the location of the object within the sensing environment 200 or the space in or around the vehicle 100. For instance, the sensor readings 904-916 can include a sensor reading from RADAR 324 that identifies a person's location outside the vehicle 100, from the LIDAR sensor/system 320 that identifies a vehicle's location proximal the vehicle 100, and/or from the camera sensors 332 that identifies an obstacle's location proximal the vehicle 100, etc. Other sensor readings may be included with each of the sensor reading data elements 904-916. Thus, each sensor reading data element 904-916 can include one or more sensor readings that identify the location of the person, obstacle, vehicle, and/or other object. Each of these sensor readings 904-916 can be taken at a certain time. The most recent time may be the last sensor reading or sensor reading N 916 taken at a final measurement time. The other sensor readings 904-912 can be made at some time before the most recent sensor reading. Thus, the vehicle 100 can track the movement of an object relative to the vehicle 100 by extrapolating the set of locations from the most recent sensor reading with the locations of the previous sensor readings over the time period represented by times of each sensor reading 904-916. In this way, the vehicle 100 can continually track or can even predict the movement of an object based on past movements.

As provided above, each time of measurement may be made at a predetermined interval, e.g., 5 microseconds, 20 milliseconds, etc. There can be any number of time portions that result in any number of measurements 904, 908, 912, 916, as represented by ellipsis 920. As such, the number of stored measurements 904, 908, 912, 916 can be predetermined or may be set by a user, or the vehicle control system 348, based on the accuracy of the measurement results desired, or required. Further, the time portions can also be predetermined or user established also based on the accuracy of the measurement desired or the speed at which the sensors 304 or processors 302, 340, 708 can functionally obtain or analyze the measurements.

Each object around the vehicle 100 can have a set of measurements while the object is within physical proximity of the vehicle 100 (e.g., 100 yards, 100 feet, etc.). Based on whether the location of the object may affect a travel path or trip for the vehicle 100, the driving and map integration engine 812 can record more or fewer sensor readings 904-916. Thus, objects in proximity to the vehicle 100, approaching the vehicle 100, adjacent to the vehicle 100 along a travel path, or following the direction of travel of the vehicle 100, may be measured more often, or be measured more accurately, than those objects behind a vehicle, moving in an opposite direction furthest lane, or moving away from the vehicle 100. As any number of objects may be within physical proximity of the vehicle 100, there may be more data structures 900 stored by the vehicle processor 708, as represented by ellipsis 924.

Figure 9B:
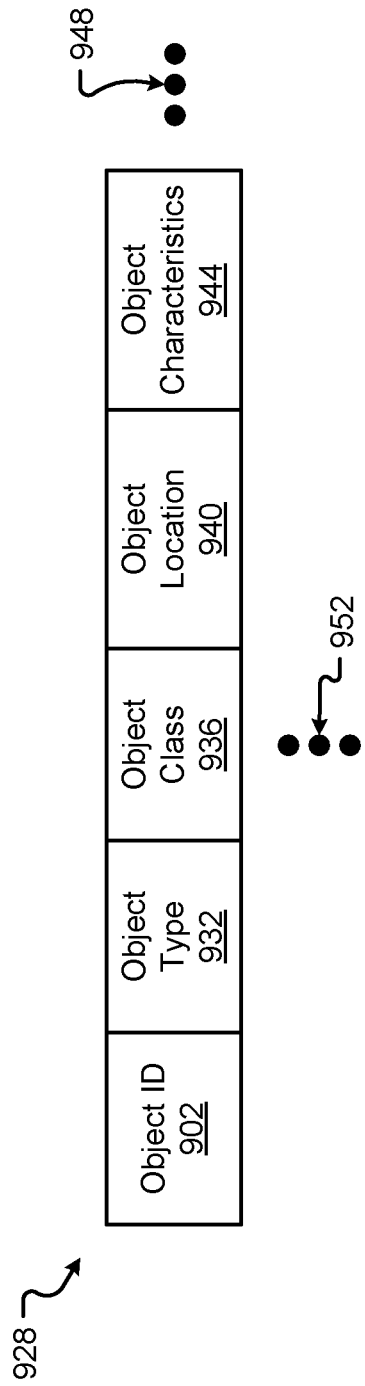
FIG. 9B is a data diagram of information associated with an object in the driving environment according to embodiments of the present disclosure.

Another data structure 928 that can identify information about the object being tracked by data structure 900 as shown in FIG. 9B. The metadata or other information about the characteristics associated with an object in data structure 928 can include the same or similar object ID 902. This object ID 902 may be the same in data structure 900 and 928 and, thus, may be able to cross-reference the sensor readings in data structure 900 with the information about the object in data structure 928. The data structure 928 can also include one or more of, but is not limited to, an object type 932, an object class 936, object location 940, object characteristics 944, and more 948. There may be more or fewer data elements in data structure 928 than those shown in FIG. 9B, as represented by ellipsis 948. As there may be more than one object being tracked, each object may have a different data structure 928, as represented by ellipses 952.

An object type 932 can identify the type of object. The type of object can include information, for example, such as the object is an animal (or more specifically, a human, a human child, a pet, a wild animal, etc.), another vehicle, an inanimate object, an obstacle, a building, a pedestrian, or other things that may be associated with an environment 200 of the vehicle 100. While these objects may be located inside or outside the vehicle 100, the objects outside of the vehicle 100 will be described as affecting a presentation of map display information to be rendered to the display devices 372 of the vehicle 100. The object type 932 can allow the vehicle 100 to determine maneuverability, accident avoidance information, low-risk paths (e.g., paths along a trip having a lowest likelihood of accident, traffic, and/or impediment to the trip when compared to other paths in the environment 200, etc.), and/or whether a particular object, or objects, should be avoided (e.g., by selecting alternative travel paths, etc.) to guide the vehicle 100.

The object class 936 can generally associate different object types 932 together. An object class 936 can include such information as the object is a human, the object is an animal, the object is inanimate, etc. Thus, the object class 936 can more generally identify the type of object designated by object ID 902. In other configurations, the object class 936 further describes the object type 932. Thus, if the object type 932 is a human, the object class 936 can categorize the object as a child, an adult, elderly, impaired, disabled, etc. In another example, if the object type 932 is a vehicle, the object class 936 can categorize the vehicle as a car, a truck, a bus, a train, etc. Thus, the object type 932 and object class 936 help the vehicle 100 determine a behavior of the object, if the object should be avoided, and/or if the user of the vehicle 100 should be alerted or informed of the object via presentation by a display device 372. Both the object type 932 and object class 936 can be predetermined by a manufacturer, set by a user of the vehicle 100, determined by a third party, for example, a government agency, etc.

The object location 940 field may include information corresponding to a location of the object relative in the environment 200 of the vehicle 100. The location information may correspond to a distance from the vehicle 100 to the object, a position of the object along a path in the environment 200, an absolute position of the object (e.g., GPS position, etc.), and/or an estimated position of the object at one or more times. In some embodiments, the location of the object may change over time. As such, the object location 940 may store locations of the object as sensed at different time intervals as described in conjunction with FIG. 9A. In one embodiment, the object location 940 may point to the sensor readings 904-916, taken at various times, of data structure 900.

The object characteristics 944 may include information associated with the object type 932 and object class 936 of the object. The object characteristics 944 may include information corresponding to a size (e.g., length, width, height, etc.) of an object, area of an object, volume of an object, estimated weight of an object, a travel speed of an object, direction of travel associated with an object, and/or combinations thereof. These object characteristics 944 may be used to determine a movement of the object, a risk of collision with the object, a timing associated with maneuvering around the object, and/or an affect the object may have on a trip or travel path of a vehicle 100. In some embodiments, the driving and map integration engine 812 may utilize the information stored in the object characteristics 944 to determine a map display presentation, an alteration to a bend angle of a displayed map, and/or a route/guidance for the vehicle 100.

Figure 9C:
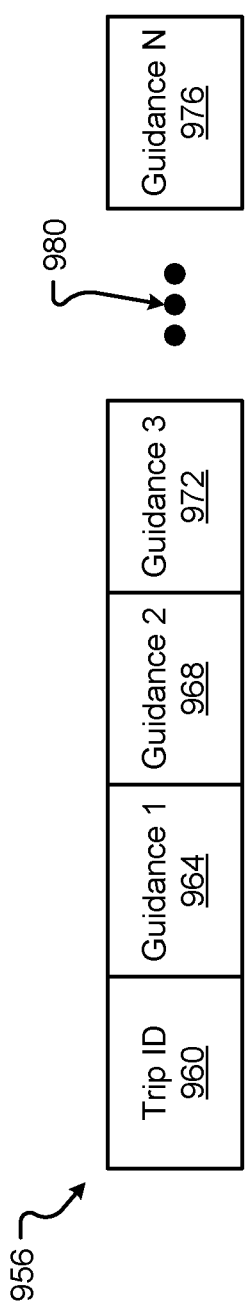
FIG. 9C is a data diagram of navigation information associated with a vehicle navigation system in accordance with embodiments of the present disclosure.

An embodiment of another data structure 956 which can provide different guidance information associated with a trip for a vehicle 100 may be as shown in FIG. 9C. There may be more or fewer guidance data than those shown in FIG. 9C, as represented by ellipses 980. Each trip may have a set of guidance data and, thus, there may be more guidance data structures 956 than those shown in FIG. 9C, as represented by ellipses 984.

The trip identifier (ID) 960 can be any type of identifier that uniquely identifies the trip from other trips of the vehicle 100. Thus, the trip ID 960 can be numeric or alphanumeric, etc. The trip ID 960 can also be information that helps identify the trip and presentation of guidance, whether planned, executed, or changed over time. The trip ID 960 can include any pointer or reference to another data structure, e.g., data structures 900, 928, to call or retrieve other data about the trip and/or environment 200 of the vehicle 100.

In some embodiments, the guidance fields 964-976 may include turn-by-turn directions and/or instructions for rendering to a display device 372 associated with the vehicle 100. The guidance information 964-976 may include a direction indication, distance of travel, time of travel, and/or the like. In one embodiment, the vehicle control system 348 may receive the guidance information 964-976 from the navigation system 302 to autonomously, or semi-autonomously, follow a route (e.g., a number of paths, turns, etc., in a trip). Each guidance information 964, 968, 972, 976 may be associated with a particular portion, segment, or time, of a trip (e.g., planned, executed, changing over time, etc., and/or ad hoc). For example, the first guidance 964 may be associated with a first portion of a trip for the vehicle 100. In this example, the first guidance may include directions for rendering to a display device 372 instructing a user and/or the vehicle 100 to travel a particular direction for a specific distance. In some embodiments, the distance associated with the first guidance 964 may change as the vehicle 100 travels along a path. Continuing this example, the second guidance 968 may include directions for rendering to a display device 372 instructing a user and/or the vehicle 100 to change direction in a specific distance or at a specific point along the path. In one embodiment, the changes of direction in the guidance fields 964-976 may serve as a trigger to alter a display presentation of a map displayed to the display device 372. The data structure 956 may include any number of directions and/or guidance information until a conclusion of the trip. As can be appreciated, each unique trip may include a specific guidance data structure 956 represented by ellipsis 984.

Figure 9D:
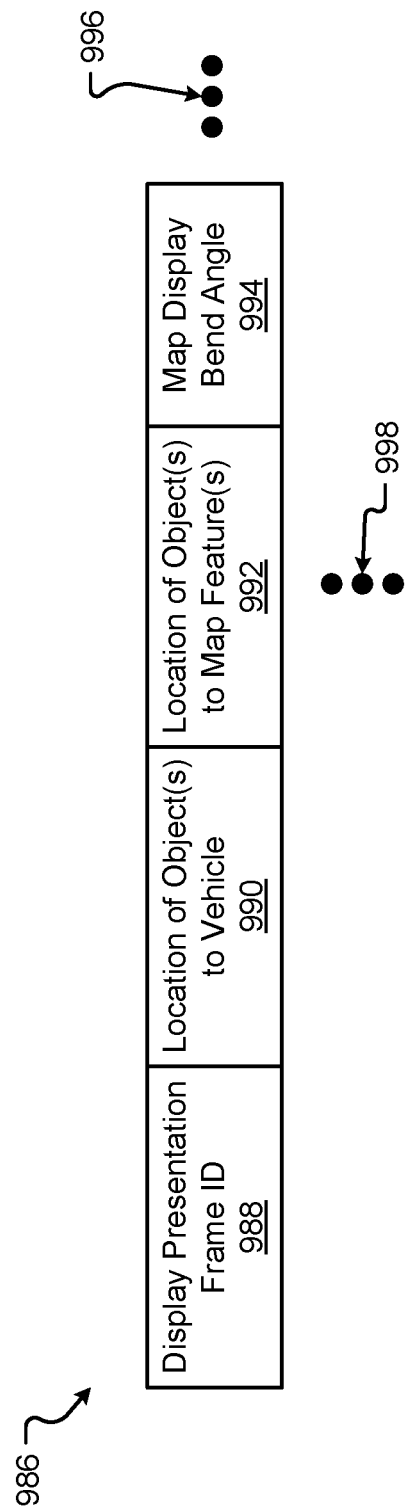
FIG. 9D is a data diagram of map display presentation information associated with a vehicle navigation system in accordance with embodiments of the present disclosure.

An embodiment of another data structure 986 for arranging a map display to be rendered by a display device 372 of a vehicle 100 may be as shown in FIG. 9D. The data structure 986 may include information corresponding to the display presentation frame ID 988, the location of object(s) to the vehicle 990, the location of object(s) to map feature(s) 992, the map display bend angle 994, and/or other information fields 996.

The display presentation frame ID 988 may be any type of identifier that uniquely identifies a display presentation frame from other map display presentation frames for rendering to a display device 372 of the vehicle 100. For instance, display presentation frame ID 988 can be numeric or alphanumeric, etc. The display presentation frame ID 988 can also be information that helps identify a presentation of map display information associated with a trip (e.g., trip ID 960, etc.) or a travel of a vehicle 100 (e.g., as the vehicle 100 travels or is scheduled to travel, etc.). The display presentation frame ID 988 can include any pointer or reference to another data structure, e.g., data structures 900, 928, 956 to call or retrieve other data about the trip, environment 200 of the vehicle 100, and/or guidance for the vehicle 100.

The location of object(s) to the vehicle 990 may include information defining a relationship of one or more objects in an environment 200 to a position and/or location of the vehicle 100. The location information may correspond to the object location 940 information as described in conjunction with the data structure 928 of FIG. 9B. In some embodiments, the object location 940 field of the data structure 928 of FIG. 9B may point, or refer, to the location information in field 990, or vice versa. As previously discussed, the location information stored in field 990 may include a range or distance (e.g., a number of feet, meters, or yards, etc.) from the object(s) to the vehicle 100, a direction from the object(s) to the vehicle (e.g., along a coordinate system, compass measurement, magnetic declination, etc.), and/or some other relative position of the object(s) to the vehicle 100. The location of the object(s) may be determined from measurement data obtained from one or more of the vehicle sensors and systems 304 and/or via a communication with a location module (e.g., GPS receiver, compass, etc.) associated with the object.

The location of object(s) to map feature(s) 992 may include information defining a relationship of one or more objects in an environment 200 to a position and/or location of one or more features on a map. Similar to the location information 990, this location information 992 may correspond to the object location 940 information as described in conjunction with the data structure 928 of FIG. 9B. In some embodiments, the object location 940 field of the data structure 928 of FIG. 9B may point, or refer, to the location information in field 992, or vice versa. As previously discussed, the location information stored in field 992 may include a range or distance (e.g., a number of feet, meters, or yards, etc.) from the object(s) to map features (e.g., streets, waypoints, paths, turns, lanes, points of interest, etc.), a direction from the object(s) to the map features (e.g., along a coordinate system, compass measurement, magnetic declination, etc.), and/or some other relative position of the object(s) to the map features. The location of the object(s) may be determined from measurement data obtained from one or more of the vehicle sensors and systems 304 and/or via a communication with a location module (e.g., GPS receiver, compass, etc.) associated with the object. In some embodiments, the vehicle sensors and systems 304 may obtain a relative distance from the vehicle 100 to the object (e.g., described in field 990) and then determine a location of the object relative to map features using the relative distance. For example, the measurements reported by one or more of the vehicle sensors and systems 304 may indicate that an object is a certain distance from the vehicle 100 in a particular direction. Using a GPS, or other absolute, position of the vehicle 100, the driving and map integration engine 812, or other processor 708, may use the certain distance and direction of the object and calculate an absolute position (e.g., GPS, etc.) for the object, by adding the vehicle absolute position (e.g., GPS position, etc.) to the certain distance and angle/direction for the object. While these location positions may change over time, it should be appreciated that additional data structures, represented by ellipsis 998, may be added to account for specific map display presentation frames to be rendered at different times.

The data structure 986 may include a map display bend angle 994 field that defines a relative angle between a point on a first map display plane and a second point on a different map display plane. The map display bend angle 994 may define a viewable area for a transition region, or plane, between the first and second map display planes. For instance, the larger the map display bend angle 994, the larger the viewable area for the transition region of the map display to be rendered by a display device 372 of the vehicle 100. The map display bend angle 994 may be based on the location of object(s) to the vehicle 990, location of object(s) to map feature(s) 992, and/or information in any combination of data structures 900, 928, 956, etc. It is an aspect of the present disclosure that the transition region of the map display provides an angular, curved, or linear transition between a substantially horizontal map plane and a substantially vertical map plane. Where the map planes are shown in a perspective fashion on a map display, objects or map features near the horizon may appear smaller than objects or map features near the foreground. Accordingly, when a need is determined to view objects or map features that are disposed near the horizon, the methods and systems presented herein may alter the map display bend angle 994 to show these objects or map features in the transition region. The arrangement of the map display planes relative to one another and the triggers required to change the map display bend angle 994 are discussed in greater detail in FIGS. 10A-16. The map display bend angle 994 may change over time, or in response to one or more triggers, and as such, additional data structures, represented by ellipsis 998, may be added to account for map display bend angles associated with various display presentation frames.

Figure 10A:
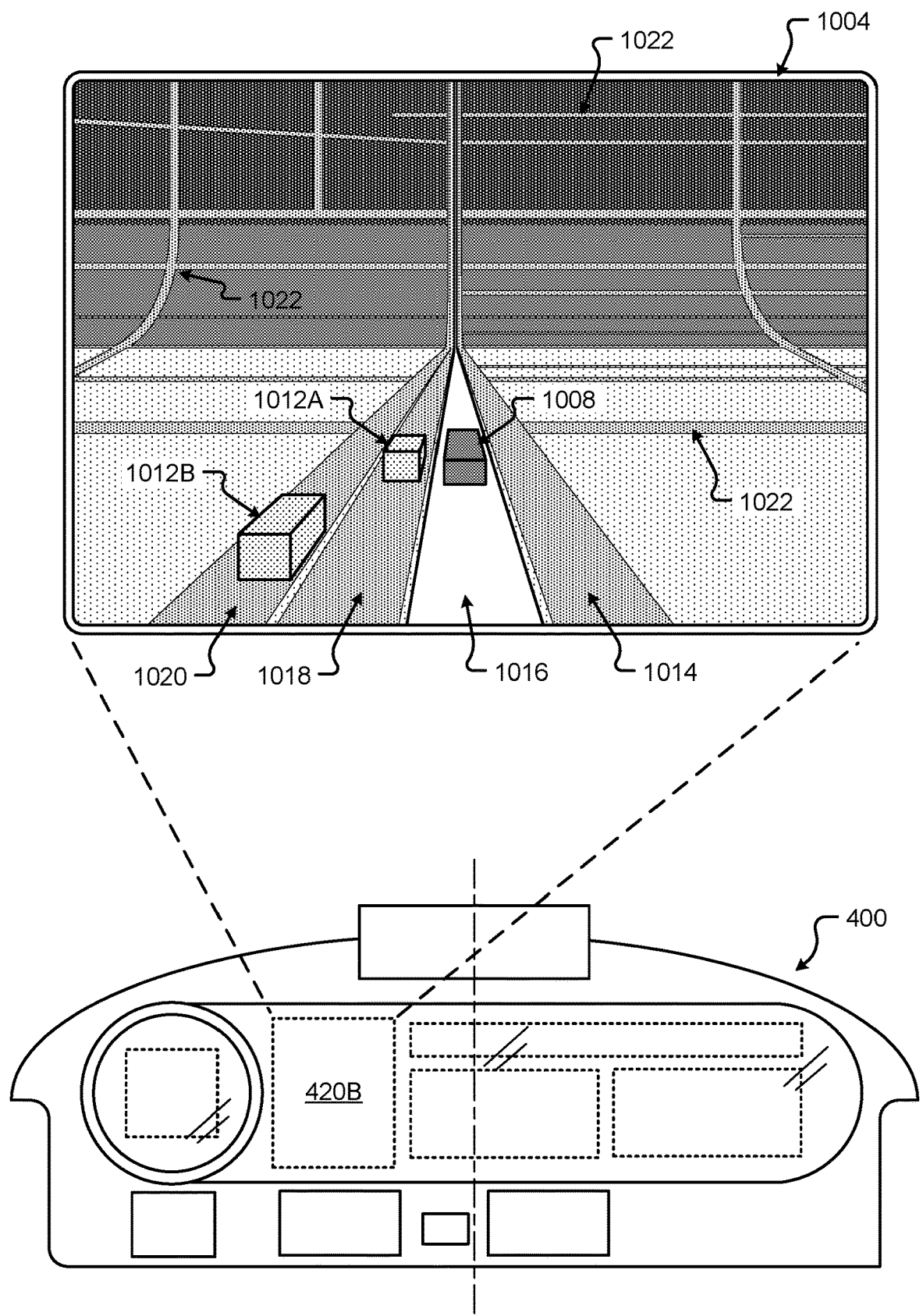
FIG. 10A shows a map of a driving environment rendered to a display device of the vehicle in accordance with embodiments of the present disclosure.
Figure 10B:
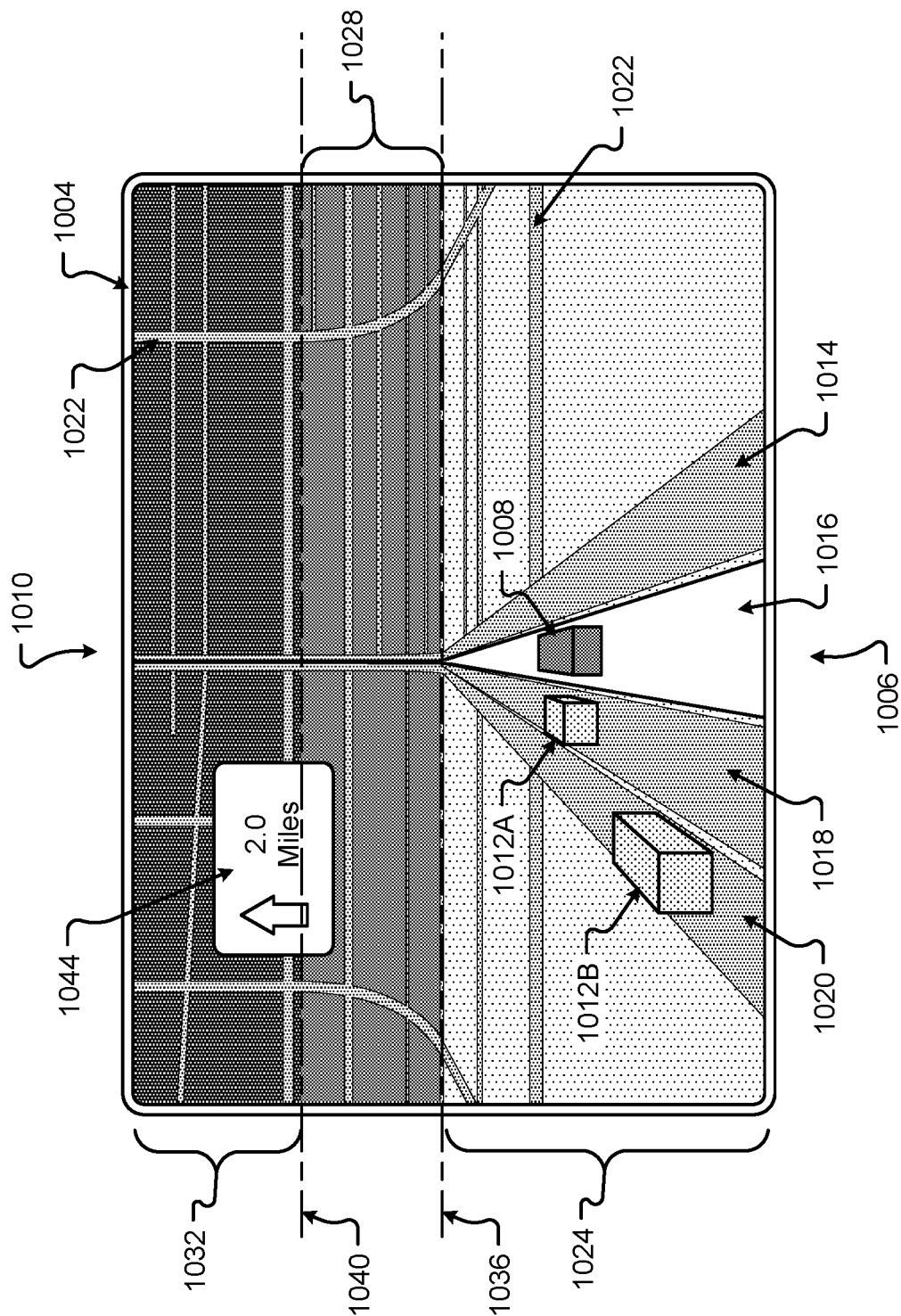
FIG. 10B shows a map of a driving environment including navigation information rendered to a display device of the vehicle in accordance with embodiments of the present disclosure.

FIGS. 10A and 10B show a map display 1004 of a driving environment 200 rendered to a display device 372, 420B of the vehicle 100 in accordance with embodiments of the present disclosure. Although shown rendered to a display device 420B of an instrument panel 400 of the vehicle 100, it should be appreciated that the map display 1004 may be rendered to any display device 372 associated with the vehicle 100. For example, the map display 1004 may be rendered to a screen of a mobile device (e.g., smartphone, tablet, portable computer, etc.) of a user who is registered with the vehicle 100.

In some embodiments, the map display 1004 may represent objects 1012A, 1012B, the vehicle 100, and/or other features, as simplified geometric shapes (e.g., cubes, parallelepiped, hyperrectangles, spheres, pyramids, cones, cylinders, squares, circles, ovals, etc.) or a combination of shapes (e.g., cones and cylinders, cubes and pyramids, ovals and rectangles, etc.). In one embodiment, the simplified geometric shapes may be to be three-dimensional shapes in the map display 1004. For instance, the vehicle 100 is shown as representative vehicle 1008 in FIGS. 10A and 10B as a rectangular cuboid in perspective (e.g., tapering toward the first transition line 1036, or a horizon line). Among other things, this perspective view presentation of simplified objects and features provides a more realistic three-dimensional view (e.g., especially for two-dimensional displays) and represents real-world items in a clean and uncluttered virtual space.

The map display 1004 may include a number of map features (e.g., roads, streets, paths, turns, landmarks, etc.) overlaid onto map display surfaces, or planes, arranged in perspective view for rendering by a display device 372. Each of the display surfaces may be arranged to form discrete viewing regions 1024-1032 on the map display 1004. The first display region 1024 visible via the map display 1004 may be associated with a first map plane (e.g., a substantially horizontal surface extending from the lower display portion 1006 to the first transition line 1036). The first display region 1024 may extend a height of the map display 1004 between the lower display portion 1006 and the first transition line 1036. The second display region 1032 visible via the map display 1004 may be associated with a second map plane (e.g., a substantially vertical surface extending from the upper portion 1010 to the second transition line 1040). The second display region 1032 may extend a height of the map display 1004 between the upper portion 1010 and the second transition line 1040. The transition region 1028 may be disposed between the first transition line 1036 and the second transition line 1040 and may interconnect the substantially horizontal surface with the substantially vertical surface. This transition region 1028 may be arranged as a curved surface, a planar surface, and/or a segmented curved and/or planar surface.

As shown in FIGS. 10A and 10B, a number of lanes 1014-1020 are shown extending from a foreground of the map display 1004 (e.g., disposed adjacent to the lower display portion 1006 to the first transition line 1036, along the transition region 1028, and extending upwardly toward the upper portion 1010 of the map display 1004 in the second display region 1032. In some embodiments, the lanes 1014-1020 shown in the first display region 1024 may be disposed substantially orthogonal to the lanes 1014-1020 shown in the second display region 1032. Among other things, this presentation of orthogonal map surfaces allows information to be displayed to the map display 1004, without compromising size and/or detail of the objects 1012A, 1012B, the representative vehicle 1008, and the paths 1022 displayed in the foreground (e.g., the first display region 1024). If the objects and map features were all displayed in a single plane, the perspective view would fail to adequately show upcoming map information, objects, and/or details necessary for accurate and safe navigation. In contrast, the present multiple-plane display can allow for a presentation of information that extends far beyond the single plane presentation, while simultaneously allowing for a realistic presentation of driving information in a perspective view.

The distance of an object (e.g., objects 1012A, 1012B, representative vehicle 1008, paths 1022, etc.) rendered in the first display region 1024 from the lower display portion 1006 may define a relative size of the object in the map display 1004. As the first display region 1024 corresponds to a planar surface disposed in perspective, objects that are located closer to the first transition line 1036 (e.g., a virtual horizon) in the first display region 1024 may appear smaller in size than the same objects located further from the first transition line 1036 and closer to the lower display portion 1006. It is an aspect of the present disclosure that the transition region 1028 may be expanded in area, or size, to move in a direction toward the lower display portion 1006 of the map display 1004 providing an enhanced detail of objects 1012A, 1012B, paths 1022, and/or other map features as determined by the driving and map integration engine 812. Increasing the area of the transition region 1028 and lowering the first transition line 1036 toward the lower display portion 1006 places objects 1012A, 1012B, paths 1022, and/or other map features in the foreground of the perspective view of the map display 1004 increasing a size of the objects 1012A, 1012B, paths 1022, and/or other map features and allowing more information to be viewed in the transition region 1028.

The map display 1004 may include a guidance indicator 1044 rendered to a portion of the display. In some embodiments, the guidance indicator 1044 may overlay one or more portions or regions 1024-1032 of the map display 1004. For example, the guidance indicator 1044 may be presented in front of the map surfaces displayed to one or more of the display regions 1024-1032. The guidance indicator 1044 may include a directional icon (e.g., an arrow, turn indicator, and/or other symbol) providing feedback to a user of the vehicle 100 regarding a guidance, navigational instruction, an intended change of direction, etc., and/or combinations thereof. Additionally or alternatively, the guidance indicator 1044 may include a distance associated with the guidance, a current rate or speed of travel associated with the vehicle 100, a speed limit associated with the path the vehicle 100 is traveling, a traffic condition and/or speed of traffic for the path ahead, etc., and/or combinations thereof. In some embodiments, the guidance indicator 1044 may be configured to display guidance information stored in the data structure 956 described in conjunction with FIG. 9C.

Figure 11B:
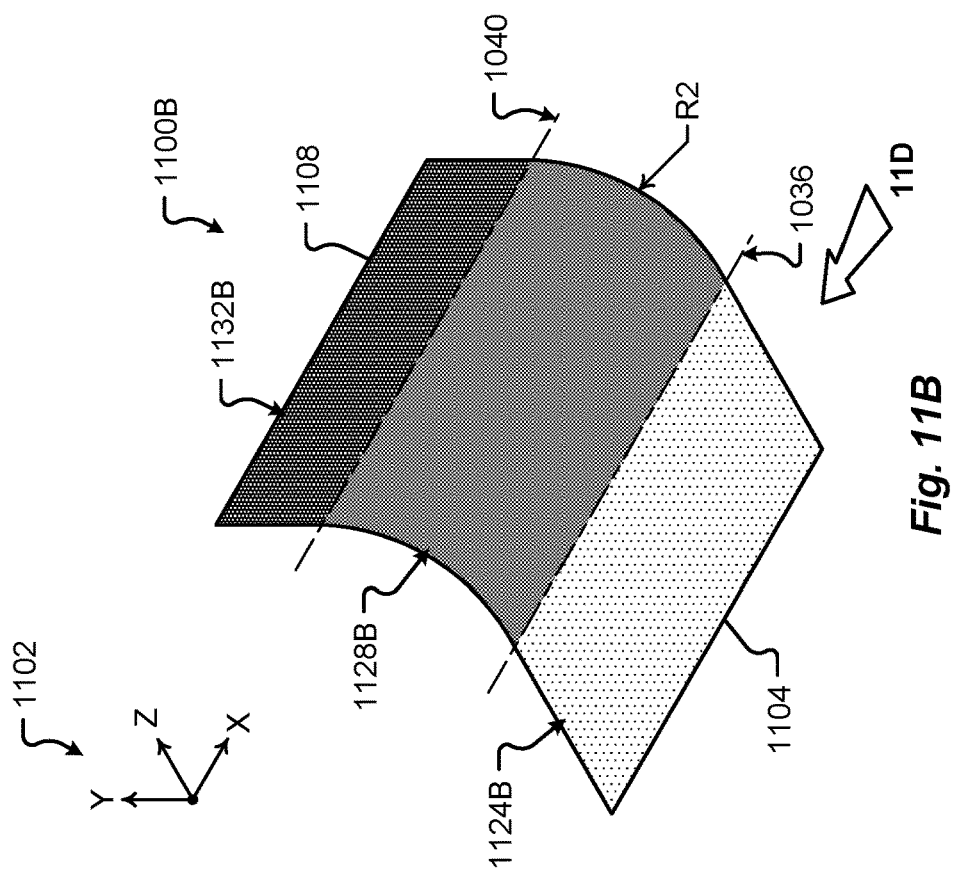
FIG. 11B shows a schematic conceptualization of a second multiple-plane map surface for rendering to a display device of the vehicle in accordance with embodiments of the present disclosure.
Figure 11A:
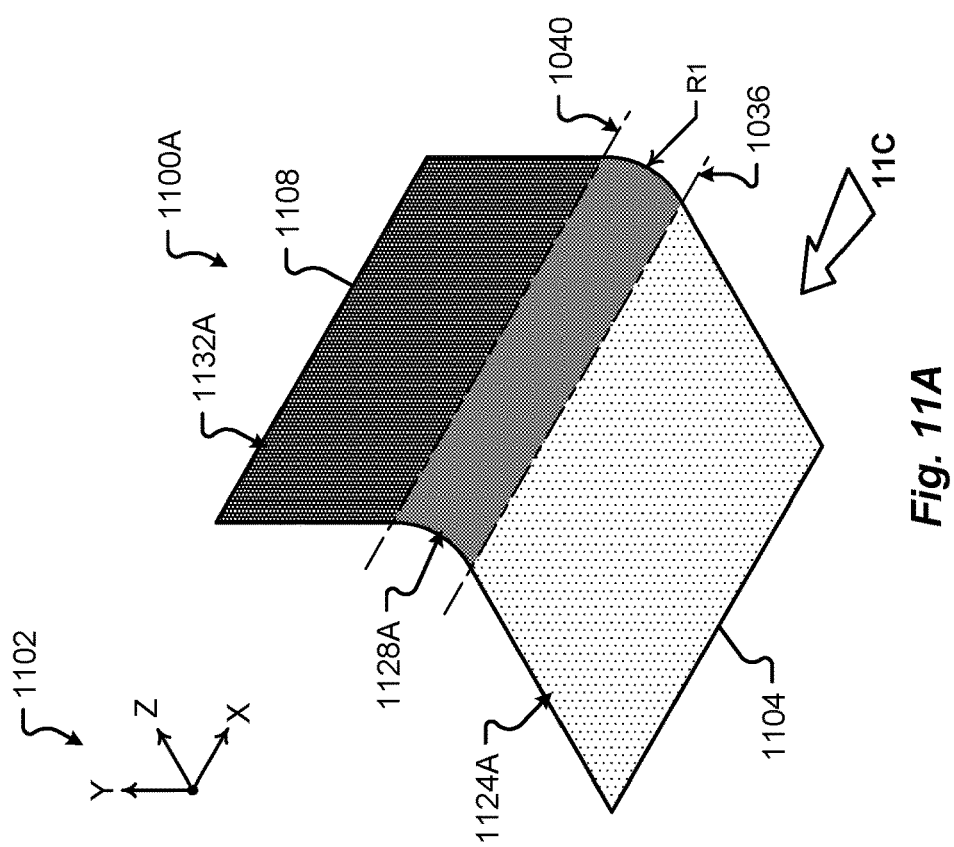
FIG. 11A shows a schematic conceptualization of a first multiple-plane map surface for rendering to a display device of the vehicle in accordance with embodiments of the present disclosure.

FIGS. 11A-11D shows various schematic conceptualizations of the multiple-plane map surface arrangements 1100A, 1100B for rendering to a display device 372 of the vehicle 100 in accordance with embodiments of the present disclosure. The conceptualizations of FIGS. 11A and 11B are shown in three-dimensions, as referenced by coordinate system 1102, to illustrate the arrangements of the map surface planes and display areas 1124A, 1124B, 1128A, 1128B, 1132A, 1132B relative to one another. When rendered to a two-dimensional screen (e.g., of a display device 372, etc.) of the vehicle 100, the map surface planes and display areas 1124A, 1124B, 1128A, 1128B, 1132A, 1132B may be viewed from some angle, or combination of angles from the XY-plane. For instance, the horizontal plane display area 1124A, 1124B may be displayed, in perspective fashion, in the first display region 1024, the vertical plane display area 1132A, 1132B may be displayed in the second display region 1032, and the transition region display area 1128A, 1128B may be displayed in the transition region 1028 of the map display 1004.

The map surface planes and display areas 1124A, 1124B, 1128A, 1128B, 1132A, 1132B may be described with reference to the coordinate system 1102 shown. The horizontal plane display area 1124A, 1124B may extend a distance from a horizontal display edge 1104 in a Z-axis direction toward the first transition line 1036, the transition region display area 1128A, 1128B, and the vertical plane display area 1132A, 1132B. The distance from the horizontal display edge 1104 to the virtual, or theoretical, intersection between the horizontal and vertical plane display areas may be referred to herein as a "depth" of the map display area. The vertical plane display area 1132A-B may extend a distance from the upper plane display edge 1108 in a Y-axis direction toward the second transition line 1040, the transition region display area 1128A, 1128B, and the horizontal plane display area 1124A, 1124B. The distance from the upper plane display edge 1108 to the virtual, or theoretical, intersection between the horizontal and vertical plane display areas may be referred to herein as a "height" of the map display area. In some embodiments, the height of the map display area may fill a majority of a height of the map display 1004. In one embodiment, the height of the map display area may fill half, or less than half of the height of the map display 1004.

Referring to FIG. 11A, a schematic conceptualization of a first multiple-plane map surface 1100A for rendering to a display device 372 of the vehicle 100 is shown in accordance with embodiments of the present disclosure. The first schematic map plane arrangement 1100A includes a map surface having a first horizontal plane display area 1124A extending a depth into the display 1004 and meeting the first transition region display area 1128A at a first transition line 1036. In some embodiments, the first transition region display area 1128A may be a curved or arcuate surface connecting the first horizontal plane display area 1124A to the first vertical plane display area 1132A. The first horizontal plane display area 1124A may be tangentially interconnected with the first transition region display area 1128A at the first transition line 1036. In some embodiments, the first transition region display area 1128A may be structured as an inclined plane (e.g., inclined an angle from the first horizontal plane display area 1124A and/or the first vertical plane display area 1132A) running from the first transition line 1036 to the second transition line 1040. In one embodiment, the first transition region display area 1128A may include a number of segmented planes disposed between the first transition line 1036 and the second transition line 1040 (e.g., following a curve, arcuate, and/or other connective path).

In FIG. 11A, the first transition region display area 1128A is shown having a curved display surface of a first radius, R1. As described herein, the driving and map integration engine 812, or other processor 708, may determine to alter a presentation of the transition region display areas 1128A, 1128B to provide a selectively adjustable transition region 1028, or area, that is viewable from the map display 1004. For example, the driving and map integration engine 812 may determine to increase the first radius, R1, of the first transition region display area 1128A to the second radius, R2, of the second transition region display area 1128B to provide a larger transition region 1028 (e.g., than the area of the first transition region display area 1128A when rendered in the map display 1004) area for displaying map information (e.g., paths, objects, etc.) in greater detail (e.g., at an increased size, scale, etc.). In some embodiments, this adjustment may be referred to as altering a bend angle of the map surface.

Figure 11C:
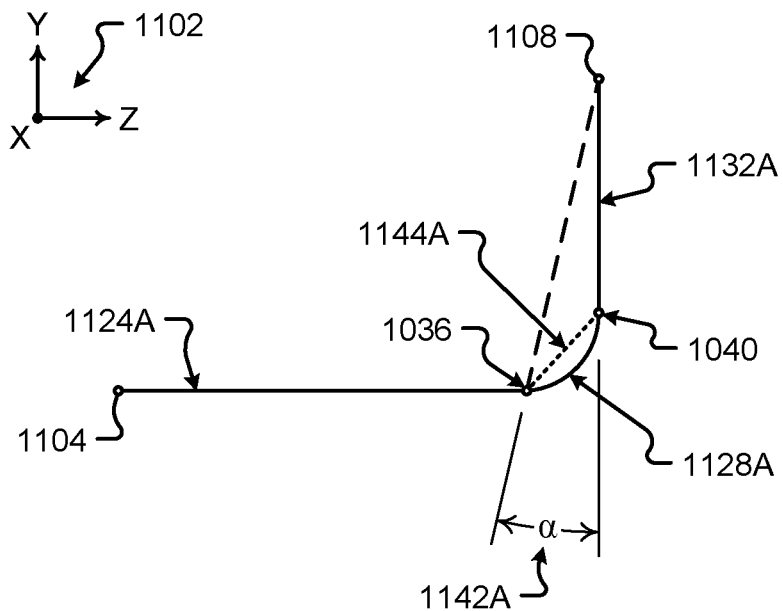
FIG. 11C shows a schematic conceptualization illustration of a bend angle associated with the first multiple-plane map surface in accordance with embodiments of the present disclosure.
Figure 11D:
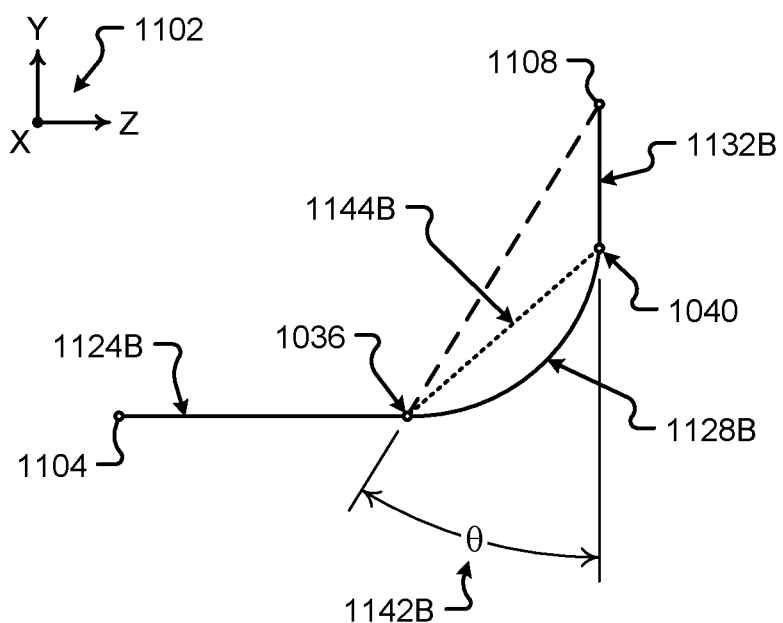
FIG. 11D shows a schematic conceptualization illustration of a bend angle associated with the second multiple-plane map surface in accordance with embodiments of the present disclosure.

FIGS. 11C and 11D illustrate side views of the schematic map plane arrangement 1100A, 1100B illustrated in FIGS. 11A and 11B, respectively. More specifically, FIG. 11C corresponds to the side view of the first schematic map plane arrangement 1100A shown in FIG. 11A and FIG. 11D corresponds to the side view of the second schematic map plane arrangement 1100B shown in FIG. 11B. In both FIGS. 11C and 11D a line is shown running from the upper plane display edge 1108 to the first transition line 1036. The bend angle 1142A, 1142B of the map surface, as described herein, may be defined as the angle measured between the vertical plane display area 1132A, 1142B and the line running from the upper plane display edge 1108 to the first transition line 1036.

The first map display bend angle 1142A is shown in FIG. 11C as having a first angle, a. This bend angle 1142A provides a specific distance between the horizontal display edge 1104 and the first transition line 1036 for the first horizontal plane display area 1124A. At this specific distance, the corresponding map display 1004 may be as shown in the first bend angle map display 1204A of FIG. 12A. As shown in FIG. 11C, the first transition region display area 1128A may follow the curved/arcuate path illustrated or follow a first chord 1144A shown running between the first transition line 1036 and the second transition line 1040.

In accordance with embodiments of the present disclosure, the map display bend angle may be automatically and/or selectively adjusted to change an appearance of display elements (e.g., objects, map features, etc.). For instance, the second map display bend angle 1142B shown in FIG. 11D has been increased from the first angle, a, to a larger second angle, θ. This bend angle 1142B provides a specific distance between the horizontal display edge 1104 and the first transition line 1036 for the second horizontal plane display area 1124B. At this specific distance, the corresponding map display 1004 may be as shown in the second bend angle map display 1204B of FIG. 12B. As shown in FIG. 11D, the second transition region display area 1128B may follow the curved/arcuate path illustrated or follow a second chord 1144B shown running between the first transition line 1036 and the second transition line 1040. The second chord 1144B of FIG. 11D has a distance that is greater than the first chord 1144A of FIG. 11C. In addition, the second transition region display area 1128B includes a greater display area (e.g., for displaying map features, objects, etc., when rendered by the display device 372) than the display area associated with the first transition region display area 1128A.

Although shown as an angle measured between the upper plane display edge 1108 and the vertical plane display area 1132A, 1132B, it should be appreciated that the map display bend angle 1142A, 1142B may be measured between any number of fixed and/or moving points associated with the map surfaces such that an increase to the map display bend angle 1142A, 1142B results in an increase to the display area associated with the transition region display area 1128A and the corresponding rendered transition region 1028 of the map display 1004.

Figure 12B:
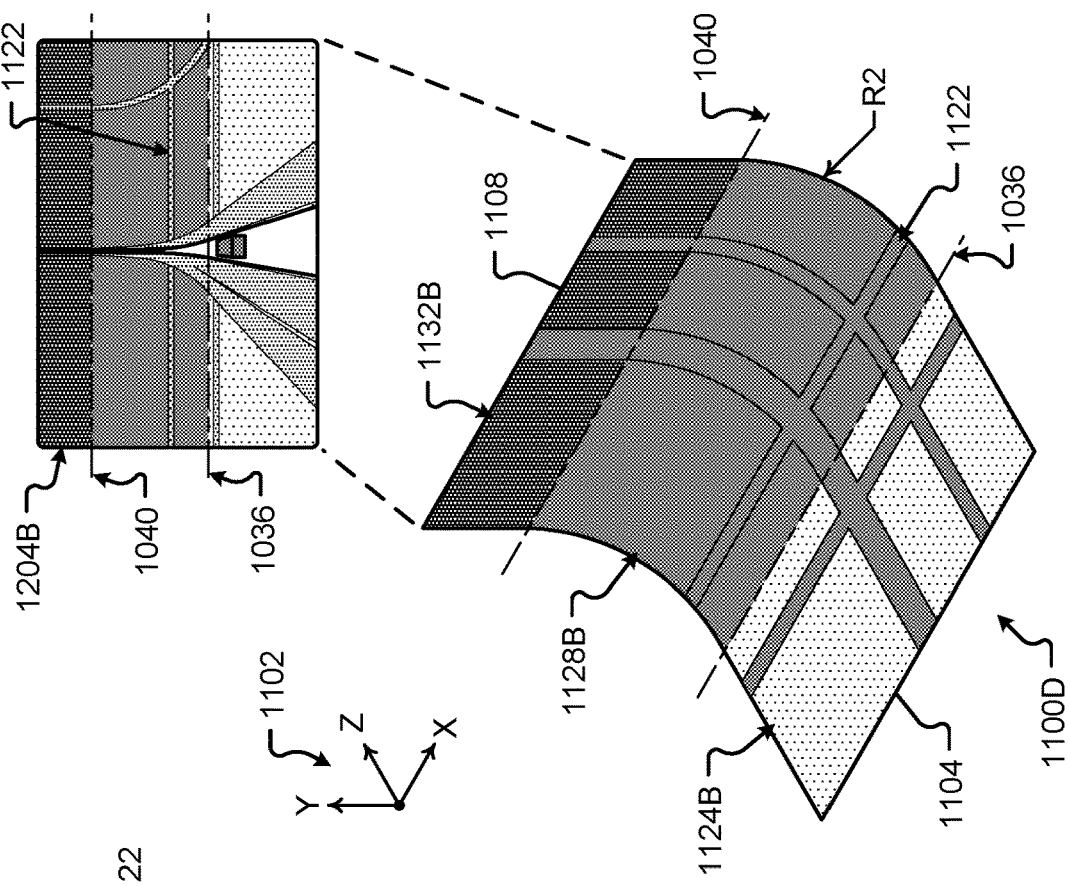
FIG. 12B shows a schematic conceptualization of a map overlaid on the second multiple-plane map surface and an appearance of the overlaid map rendered by a display device of the vehicle in accordance with embodiments of the present disclosure.
Figure 12A:
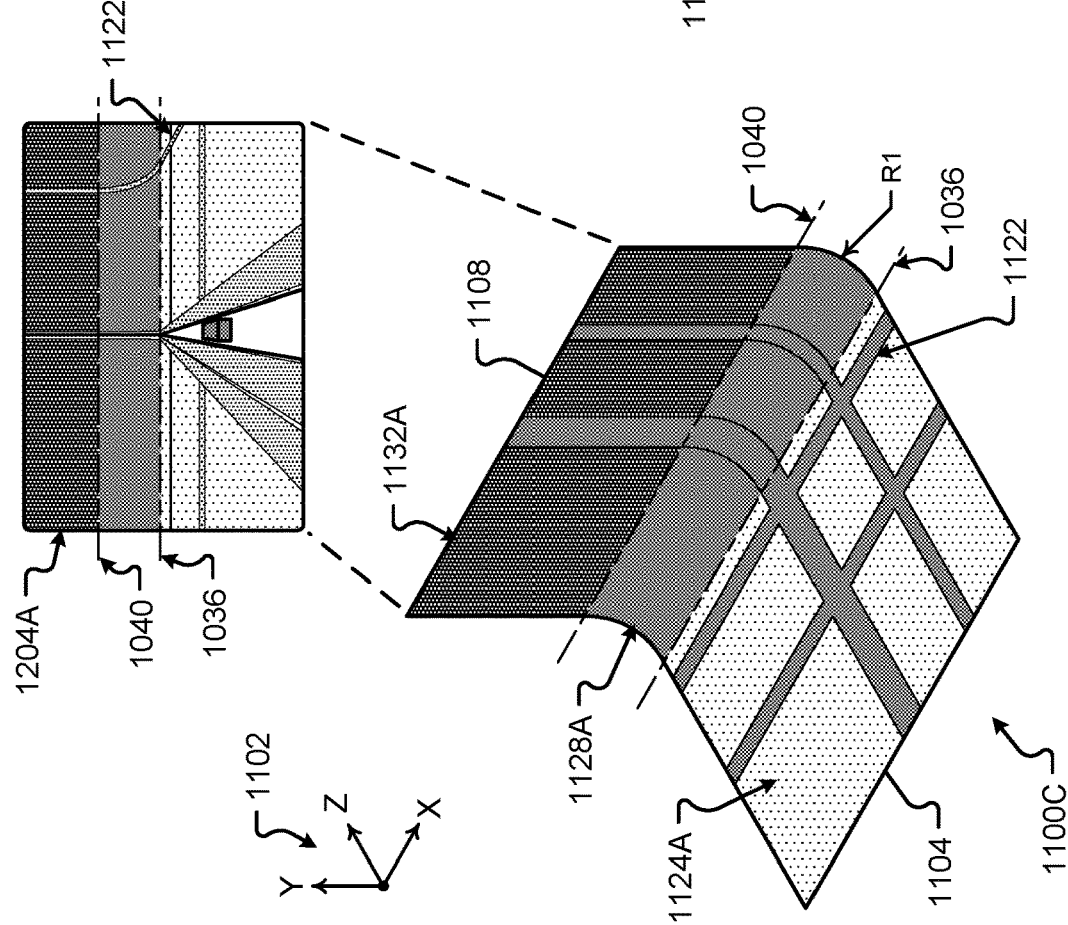
FIG. 12A shows a schematic conceptualization of a map overlaid on the first multiple-plane map surface and an appearance of the overlaid map rendered by a display device of the vehicle in accordance with embodiments of the present disclosure.

FIGS. 12A and 12B illustrate a map that is overlaid onto the multiple-plane map surfaces having different bend angles of FIGS. 11A and 11B, respectively. The same map is overlaid in both FIGS. 12A and 12B. However, due in part to the different bend angles 1142A, 1142B associated with the multiple-plane map surfaces 1100A, 1100B of FIGS. 12A and 12B, respectively, the map appears different in the respective bend angle map displays 1204A, 1204B. For instance, the different the radiuses of curvature, R1, R2, associated with the transition region display areas 1128A, 1128B, provide a different rendered display of the map features.

By way of example, the intersecting path 1122 shown in the first horizontal plane display area 1124A of FIG. 12A is almost imperceptible in the perspective first bend angle map display 1204A, or rendered, presentation. In fact, the intersecting path 1122 shown in the first bend angle map display 1204A appears only as a thin horizontal line disposed adjacent to the first transition line 1036 in the first display region 1024. The same intersecting path 1122 is shown in the multiple-plane map surface of FIG. 12B having the increased second map display bend angle 1142B. In the second bend angle map display 1204B, the intersecting path 1122 is shown in the second transition region display area 1128B (e.g., the curved surface) of FIG. 12B. The presentation of the intersecting path 1122 to the second transition region display area 1128B, and the transition region 1028, in the second bend angle map display 1204B provides an increased size or scale to the map features therein and, more specifically, to the intersecting path 1122. In contrast to the thin line representing the intersecting path 1122 in FIG. 12A, the intersecting path 1122 shown in the second bend angle map display 1204B is more defined, larger, and clearly visible. It is an aspect of the present disclosure that the driving and map integration engine 812, and/or other processor 708, may determine to present critical information, traffic, objects, guidance paths, and/or other map features in a larger transition region 1028 to provide enhanced detail and/or feedback to a user of the vehicle 100.

Figure 13A:
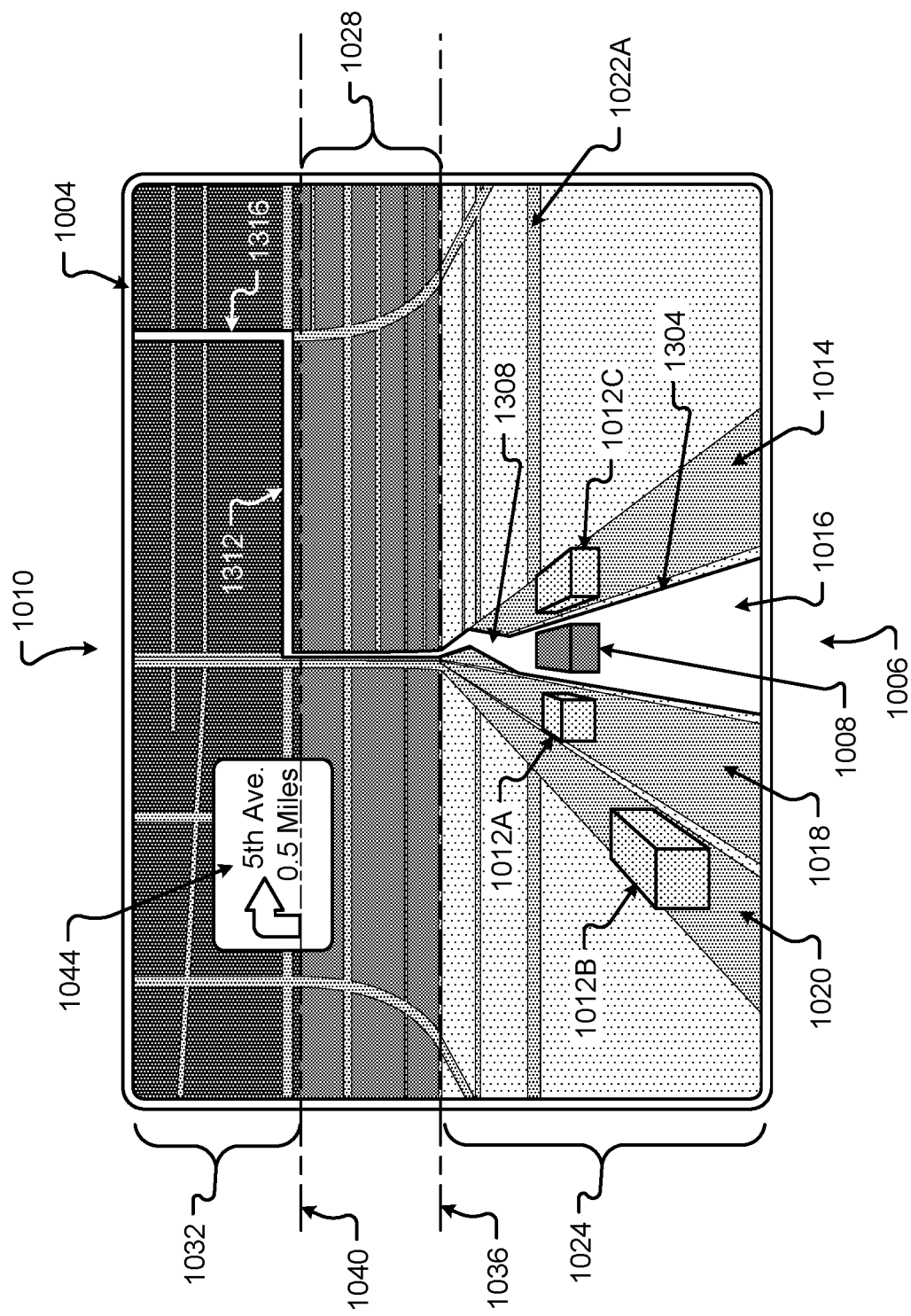
FIG. 13A shows a map of a driving environment including navigation information rendered to a display device of the vehicle at a first time in accordance with embodiments of the present disclosure.
Figure 13B:
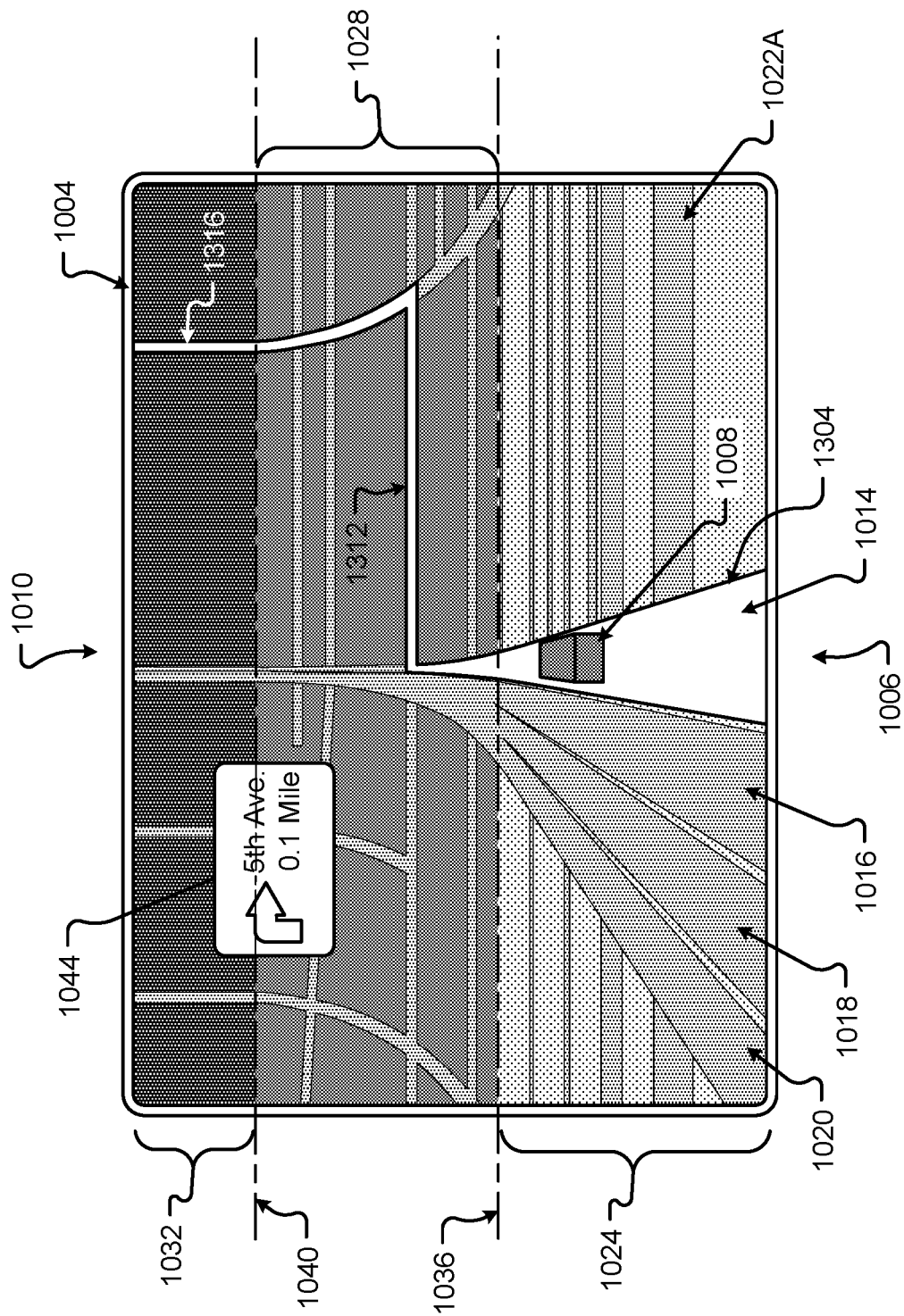
FIG. 13B shows the map of the driving environment including navigation information rendered to the display device of the vehicle at a second time in accordance with embodiments of the present disclosure.
Figure 13C:
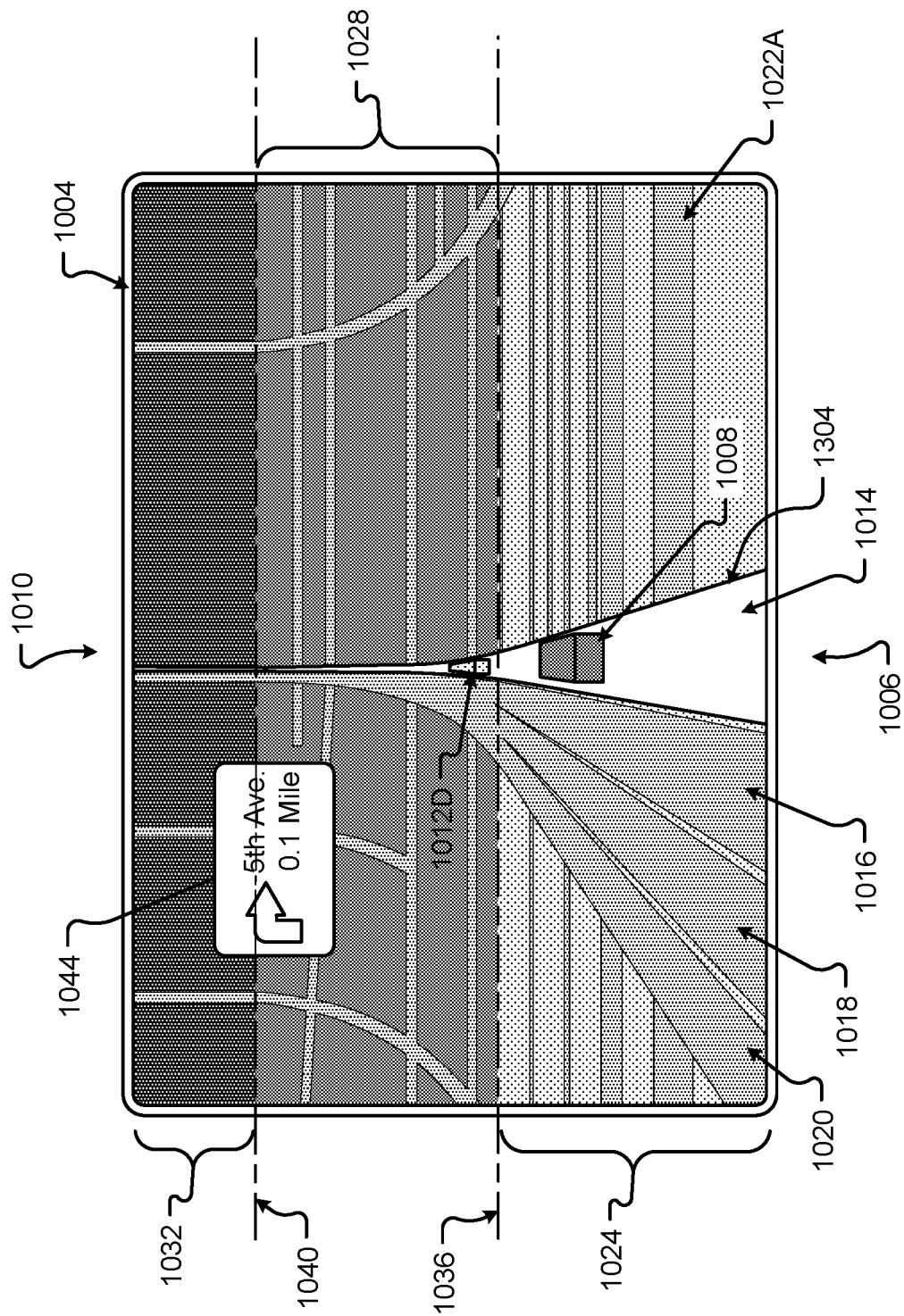
FIG. 13C shows the map of the driving environment including navigation information rendered to the display device of the vehicle at a third time in accordance with embodiments of the present disclosure.

FIGS. 13A-13C show various maps of a driving environment and navigational information presented to a map display 1004 in accordance with embodiments of the present disclosure. The map display 1004, representative vehicle 1008, paths 1022, and/or the objects 1012A-D may be similar, if not identical, to any of those elements as previously described. Additionally or alternatively, the display regions 1024-1032, transition lines 1036, 1040, and/or other features of the map display 1004 may be similar, if not identical, to any of those elements as previously described. The maps of FIGS. 13A-13C show a combined rendering of map features and detected object information in an environment 200 of the vehicle 100 in a single display presentation. In some embodiments, the detected object information (e.g., objects 1012A-D, etc.) may be represented in the map display 1004 as simplified schematic versions of actual objects. For instance, a user viewing the map display 1004 may only wish to be presented with pertinent information (e.g., location, proximity, size, etc.) of an object detected in the environment 200 of the vehicle 100. The user may want to know how close and where surrounding vehicles or pedestrians are without additional physical details of these objects. In this example, the user does not care whether another vehicle in proximity to the vehicle 100 is a certain color, only that the other vehicle is close to the vehicle 100 and/or on a particular side of the vehicle 100. It is an aspect of the present disclosure to present pertinent information in an uncluttered and clean user interface or display.

The maps illustrated in FIGS. 13A-13C include one or more lanes 1014-1020, paths 1022A, a travel route 1304, a first route direction change 1312, a second route direction change 1316, and objects 1012A-D disposed in an environment 200 around a representative vehicle 1008. As shown in FIG. 13A, a vehicle 100, illustrated as the representative vehicle 1008 icon, is traveling along a travel route 1304 overlaying a second lane 1016 in the first display region 1024. As the vehicle 100 moves in the environment 200, the map features (e.g., paths, etc.) may move, or scroll (e.g., along the multiple-plane map surface), from the upper portion 1010 of the map display 1004 to the lower display portion 1006 of the map display 1004. The travel route 1304 is shown in FIG. 13A as including a suggested route lane change 1308 ahead of third object 1012C. In addition, the guidance indicator 1044 includes instructions that the vehicle 100 should turn on $5^{th}$ Ave. in 0.5 miles. This turn may correspond to the first route direction change 1312 highlighted and visible in the second display region 1032 of the map display 1004.

As described herein, the vehicle 100 may collect information from the vehicle sensors and systems 304 to determine object information (e.g., information in data structures 900, 928, 986) of objects 1012A-C in an environment 200 of, and/or in proximity to, the vehicle 100. Based on the information, or sensor data, obtained from the sensors 304, the driving and map integration engine 812 may render the locations, sizes, positions, and/or other information regarding the objects 1012A-C to the map display 1004. The rendered image may include a location of the objects 1012A-C relative to the representative vehicle 1008 in the map display 1004. As shown in FIG. 13A, the representative vehicle 1008 is traveling in the second lane 1016 of a path (e.g., in a direction from the lower display portion 1006 to the upper portion 1010) and a first object 1012A is located adjacent to the representative vehicle 1008 (e.g., on a left side of the vehicle 100) in the third lane 1018. In addition, a third object 1012C is located adjacent to the representative vehicle 1008 (e.g., on a right side of the vehicle 100) in the first lane 1014. The second object 1012B is shown located in the fourth lane 1020 at a position furthest from the representative vehicle 1008. The objects 1012A-C may correspond to vehicles other than the vehicle 100 traveling in the environment 200 of the vehicle 100.

In some embodiments, the first and second lanes 1016 may correspond to a first direction of traffic along a path (e.g., heading in a direction from the lower display portion 1006 toward the upper portion 1010), and the third and fourth lanes 1020 may correspond to a different second direction of traffic along the path (e.g., heading in a direction from the upper portion 1010 toward the lower display portion 1006). Alternatively, the lanes 1014-1020 may all include traffic flowing in the same direction (e.g., heading in a direction from the lower display portion 1006 toward the upper portion 1010), such as traffic flowing on a one-way street or multiple-lane (e.g., two-lane, three-lane, four-lane, etc.) highway.

The route lane change 1308 suggested by the navigation system 302 and rendered to the display device 372 via the driving and map integration engine 812 may include a timing and/or a location associated with the lane change to avoid a collision, risk of collision, or other incident. For example, the route lane change 1308 directing the vehicle 100 move from traveling in the second lane 1016 to traveling in the first lane 1014 is shown disposed ahead of the third object 1012C. This time and/or location of the route lane change 1308 may be based on a travel speed of the vehicle 100, a speed of the third object 1012C, a behavior of the objects 1012A-C in the environment 200, and/or upcoming navigational instructions (e.g., upcoming turn or first route direction change 1312, etc.) associated with the travel route 1304.

Once the vehicle 100 changes lanes (e.g., from the second lane 1016 to the first lane 1014, etc.) the representative vehicle 1008 may be shown as traveling in the first lane 1014 along the travel route 1304. In FIG. 13B, the driving and map integration engine 812, in conjunction with the guidance and/or navigation information from the navigation system 302 and/or data structure 956, may determine an upcoming first route direction change 1312 or other map change requires an adjustment to the map display bend angle 1142 and a size of the transition region 1028. In FIG. 13B, the vehicle 100 has traveled along the travel route 1304 from the first position and time shown in FIG. 13A and the upcoming first route direction change 1312, or turn, is within closer in distance (e.g., 0.1 miles, 300 feet, 100 feet, 50 feet, etc.) from the vehicle 100. As such, the driving and map integration engine 812 may determine that an enhanced visual feedback (e.g., increase in scale, size, or detail) of the first route direction change 1312 and/or other map features should be presented to the user of the vehicle 100 via the map display 1004. In this case, the driving and map integration engine 812 may determine to increase a size or area of the transition region 1028 shown in FIG. 13A to the size and area of the transition region 1028 shown in FIG. 13B and display the first route direction change 1312 on the transition region display area 1128 associated with the transition region 1028. The increase in the rendered area of the transition region 1028 essentially moves the map information closer to the lower display portion 1006 and/or the representative vehicle 1008 of the map display 1004 and angles the map elements into a highly visible zone of the map display 1004. Among other things, this presentation allows a user of the vehicle 100 to better see the first route direction change 1312 and/or any other objects 1012 or map features along the travel route 1304 in this region 1028 (e.g., because the elements appear closer, larger in size, and/or in a different plane than the representative vehicle 1008.

In some embodiments, the map display bend angle 1142 and a size of the transition region 1028 may be increased from the angle 1142 and size shown in FIG. 13A when an object 1012D is determined along the travel route 1304 of, and in proximity to, the vehicle 100. FIG. 13C shows an object 1012D in the same lane 1014 and/or travel path 1304 as the vehicle 100. The rendered object 1012D may represent another vehicle, an obstacle, a pedestrian, an animal, or any other tangible object or thing in the environment 200 of the vehicle 100. In one embodiment, the vehicle sensors and systems 304 may determine that the object 1012D is in the same lane or travel path 1304 of the vehicle 100 and the driving and map integration engine 812 may determine that enhanced visual feedback (e.g., an increase in scale, size, or detail) of the object 1012D and/or other map features should be presented to the user of the vehicle 100 via the map display 1004. In some embodiments, the object information may be obtained from the sensors 304 and/or retrieved from one or more data structures 900, 928, 986, etc. The driving and map integration engine 812 may determine to increase a size or area of the transition region 1028 shown in FIG. 13A to the size and area of the transition region 1028 shown in FIG. 13C and display the object 1012D on the transition region display area 1128 associated with the transition region 1028. The increase in the rendered area of the transition region 1028 essentially moves the map information and object 1012D closer to the lower display portion 1006 and/or the representative vehicle 1008 of the map display 1004 and angles the map elements and location of the object 1012D into a highly visible zone of the map display 1004. Among other things, this presentation allows a user of the vehicle 100 to better see the object 1012D relative to the representative vehicle 1008 in this region 1028 (e.g., the object 1012D appears closer, larger in size, in the transition region 1028 of FIG. 13C than it would if the object 1012D were rendered in the first display region 1024 and the horizontal plane display area 1124 of FIG. 13A).

It should be appreciated that the driving and map integration engine 812 may dynamically, continually, and/or automatically change the map display bend angle 1142 based on the guidance information (e.g., as described in conjunction with FIG. 13B), the object information (e.g., as described in conjunction with FIG. 13C), and/or combinations thereof.

Figure 14:
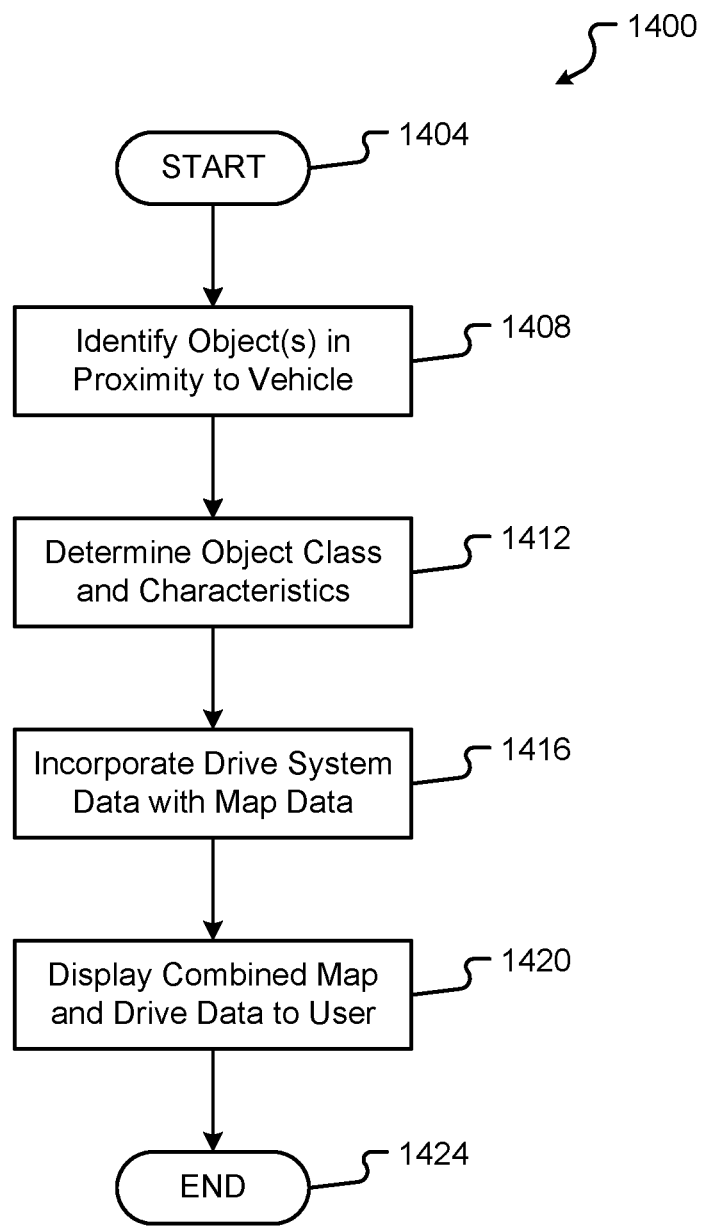
FIG. 14 is a flow diagram of a method for determining a map display presentation and information to render to a display device in accordance with embodiments of the present disclosure.

An embodiment of a method 1400 for determining a map display presentation and information to render to a display device may be as provided in FIG. 14. A general order for the steps of the method 1400 is shown in FIG. 14. Generally, the method 1400 starts with a start operation 1404 and ends with operation 1424. The method 1400 can include more or fewer steps or can arrange the order of the steps differently than those shown in FIG. 14. The method 1400 can be executed as a set of computer-executable instructions executed by a computer system or processor (e.g., driving and map integration engine 812, processor 708, etc.) and encoded or stored on a computer readable medium (e.g., control data 364, working memory 736, etc.). In other configurations, the method 1400 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1400 shall be explained with reference to the systems, components, circuits, modules, software, data structures, signaling processes, models, environments, conceptualizations, vehicles, etc. described in conjunction with FIGS. 1-13C.

The method 1400 begins at step 1404 and proceeds when an object identification engine 804 identifies objects in proximity to the vehicle 100 (step 1408). The object identification engine 804 can receive one or more sensor readings from sensors 304. The sensor readings can identify any type of object within the sensing environment 200 of the vehicle 100. For example, the object identification engine 804 can identify the various objects 1012A-D, as described in conjunction with FIGS. 10A, 10B, and 13A-13C. The objects can be provided an object ID 902 and a data structure 900. Further, the object identification engine 804 can create the data structure 928 described herein for each of the different objects in the environment 200.

The object identification engine 804 can then characterize the different objects identified by determining one or more of the object type, class, location, and characteristics, in step 1412. The object identification engine 804 can create data structure 928 with the object type 932, object class 936, object location 940, and/or object characteristics information 944. This information may be gleaned from sensor readings 304 or can be provided through user input or by historical information. Thus, each of the different objects can be characterized by the object identification engine 804 and tracked by subsequent sensor readings 904-916 taken at different times. This object information may then be provided to the driving and map integration engine 812.

The driving and map integration engine 812 may combine the object information, including locations of the objects and/or relative locations of the objects to the vehicle 100, with map data (e.g., received from the navigation system 302 and/or navigation source 356A, etc.) in step 1416. The map data may include stored map information associated with a travel route, trip, and/or environment of the vehicle 100. The map information may be retrieved based on GNSS location data (e.g., GPS location, etc.) of the vehicle 100. As the navigation system 302 can track a position of the vehicle 100 relative to specific features (e.g., roads, paths, turns, etc.) in the map data, the driving and map integration engine 812 can take the determined positions of the objects relative to the vehicle 100 (e.g., detected by the sensors 304) and calculate positions for each of the objects on the map data. For instance, if the vehicle 100 is determined to be traveling along a path at a first time, and car is determined (based on the sensor data) to be located 8 feet from the vehicle 100 on a right side of the vehicle 100 traveling at the same speed and general direction as the vehicle 100, the driving and map integration engine 812 can determine a position for the car (e.g., a simplified representative image as described herein, etc.) on the map. This positional, or location, information for the objects may be overlaid onto a map and updated as the vehicle 100 travels in the environment 200. A size of the representative images of each object in the environment 200 to be rendered to the map display may be based on a size of features and/or display of the map on the map display. For example, the displayed angle, perspective, scale, and/or other display information associated with the map may correspond to the displayed angle, perspective, scale, and/or other display information associated with the representative images of the objects rendered thereon.

Next, the method 1400 continues by displaying the combined map and drive data (e.g., object information) to the user of the vehicle 100 via a display device 372 (e.g., display device 420B, etc.) in step 1420. The incorporated drive system data (e.g., object data) and map data determined in step 1416 may be provided from the driving and map integration engine 812 to the user interface driver 808 of the navigation system 302. The user interface driver 808 may control the user interface/display device 372 to render the combined, or integrated, map and object data to a map display shown on the display device 372. The combined map and object data rendered by the display device 372 may be as illustrated in FIGS. 10A, 10B, and 13A-C. It is an aspect of the present disclosure that the information rendered to the map display may continually change as the environment 200 changes, objects in the environment change, the map changes, and/or the position of the vehicle 100 in the environment 200 changes. The method 1400 ends at step 1424.

Figure 15:
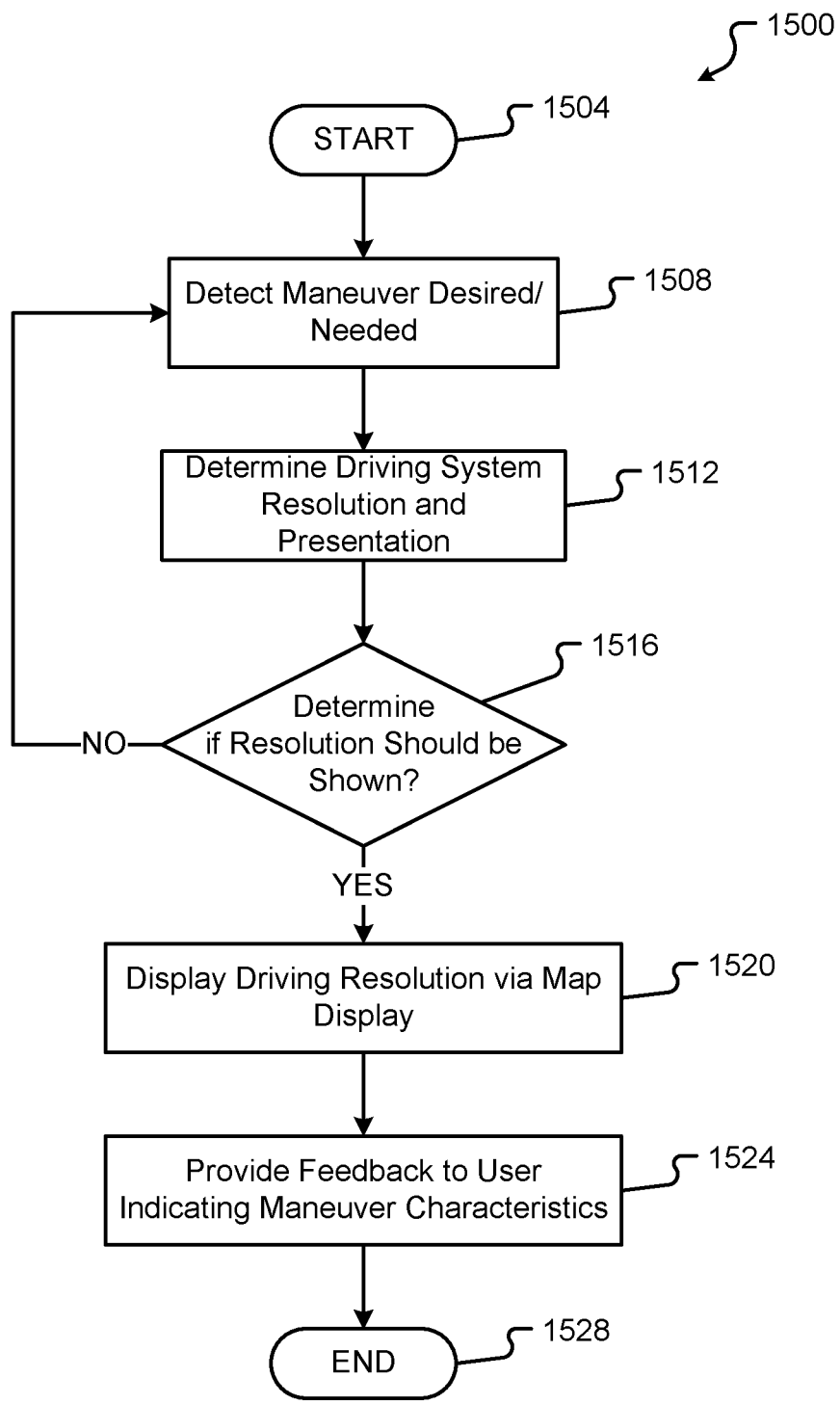
FIG. 15 is a flow diagram of a method for altering a display presentation of a map and information rendered to a display device in accordance with embodiments of the present disclosure.

An embodiment of a method 1500 for altering a display presentation of a map and information rendered to a display device may be as provided in FIG. 15. A general order for the steps of the method 1500 is shown in FIG. 15. Generally, the method 1500 starts with a start operation 1504 and ends with operation 1528. The method 1500 can include more or fewer steps or can arrange the order of the steps differently than those shown in FIG. 15. The method 1500 can be executed as a set of computer-executable instructions executed by a computer system or processor (e.g., driving and map integration engine 812, processor 708, etc.) and encoded or stored on a computer readable medium (e.g., control data 364, working memory 736, etc.). In other configurations, the method 1500 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1500 shall be explained with reference to the systems, components, circuits, modules, software, data structures, signaling processes, models, environments, conceptualizations, vehicles, flow diagrams, etc. described in conjunction with FIGS. 1-14.

The method 1500 begins at step 1504 and proceeds by determining whether a driving maneuver is desired or needed (step 1508). In some embodiments, a driving maneuver may be needed when a navigational guidance includes instructions or directions for a planned trip. The guidance information may be stored in a data structure 956 as described in conjunction with FIG. 9C. In one embodiment, the driving maneuver may be needed when the vehicle sensors and systems 304 determine a change in position or behavior associated with one or more objects in the environment 200. For instance, another vehicle may move into a lane of the vehicle 100, a pedestrian may walk onto a travel path, or an obstacle may be detected at a point along a route the vehicle 100 is taking. This object information may be stored in one or more data structures 900, 928, 986 as described in conjunction with FIGS. 9A, 9B, and 9D. In any event, the driving and map integration engine 812 may refer to one or more rules stored in memory (e.g., working memory 736, etc.) to determine when a particular maneuver is needed.

Next, the driving and map integration engine 812 may determine a driving system resolution and presentation based on the determined maneuver needed in step 1508 (step 1512). Determining the resolution and presentation may correspond to determining the map display bend angle, transition region 1028 size or area, and/or a corresponding size or scale of elements (e.g., objects, map features, etc.) to be rendered by a display device of the vehicle 100 as previously described. The map display bend angle, the size of the various planes of the multiple-plane map surface arrangements, and/or the elements displayed thereto may depend on a number of triggers, rules, and/or data. The location of map features and/or objects to the vehicle 100 may determine a type of resolution and/or presentation of the map in the map display 1004. Additionally or alternatively, the guidance provided to a vehicle 100 may determine, based on a speed of travel of the vehicle 100, a particular resolution and presentation of map information to the map display 1004.

The method 1500 may continue when the driving and map integration engine 812, or other processor 708, determines that the resolution (e.g., the bend angle and sizing of features, etc.) should be rendered to the display device 372 of the vehicle 100 (step 1516). In some embodiments, this determination may include the driving and map integration engine 812, for example, referring to rules stored in memory to determine whether a map display presentation should be altered. For instance, the driving and map integration engine 812 may determine a type of resolution and/or presentation of the map in the map display 1004 that is different from a presentation already rendered by the display device. If the display device is rendering a map display at a first display resolution (e.g., bend angle, etc.), the driving and map integration engine 812 may determine whether a trigger exists in the environment 200 and/or trip to cause a change in the resolution. For example, a location of an object in a predefined distance or proximity to the vehicle 100 may be used to trigger a change in the resolution. In this example, vehicles or other objects that are detected as being close to, or approaching, the vehicle 100 may cause an increase in the bend angle and/or resolution to provide visual feedback of the vehicles/objects to a user of the vehicle 100. As another example, a trip guidance may include instructions to change directions from a travel path associated with the vehicle 100. These instructions may require the user of the vehicle 100 to turn in a predetermined distance or amount of time. As such, the bend angle of the map display may be changed to provide a clear visual representation of the upcoming turn on the transition region 1028 of the multiple-plane display. In any event, determining whether the resolution should be shown may include determining that a change to the bend angle is required as described herein.

When the resolution should be shown, the method 1500 continues by displaying the driving resolution (e.g., the determined bend angle, etc.) to the user of the vehicle 100 via the map display of a display device 372 (e.g., display device 420B, etc.) in step 1520. The resolution determined in step 1512 may be provided from the driving and map integration engine 812 to the user interface driver 808 of the navigation system 302. The user interface driver 808 may control the user interface/display device 372 to render the determined resolution of the map features to a map display shown on the display device 372. The information rendered to the map display may continually change as the environment 200 changes, objects in the environment change, the map changes, and/or the position of the vehicle 100 in the environment 200 changes.

In some embodiments, the map display may include a highlighted route, guidance indications, or other information and feedback provided to the user of the vehicle 100 via the display device 372 of the vehicle 100 (step 1524). The feedback may include highlighting portions of a travel path, increasing a size of a path, and/or moving a portion of the path onto a visible plane in the multiple-plane surface arrangements described herein. In one embodiment, the feedback may include providing route or trip guidance instructions via a guidance indicator 1044 associated with the map display 1004. In any event, the method 1500 may end at step 1528.

Figure 16:
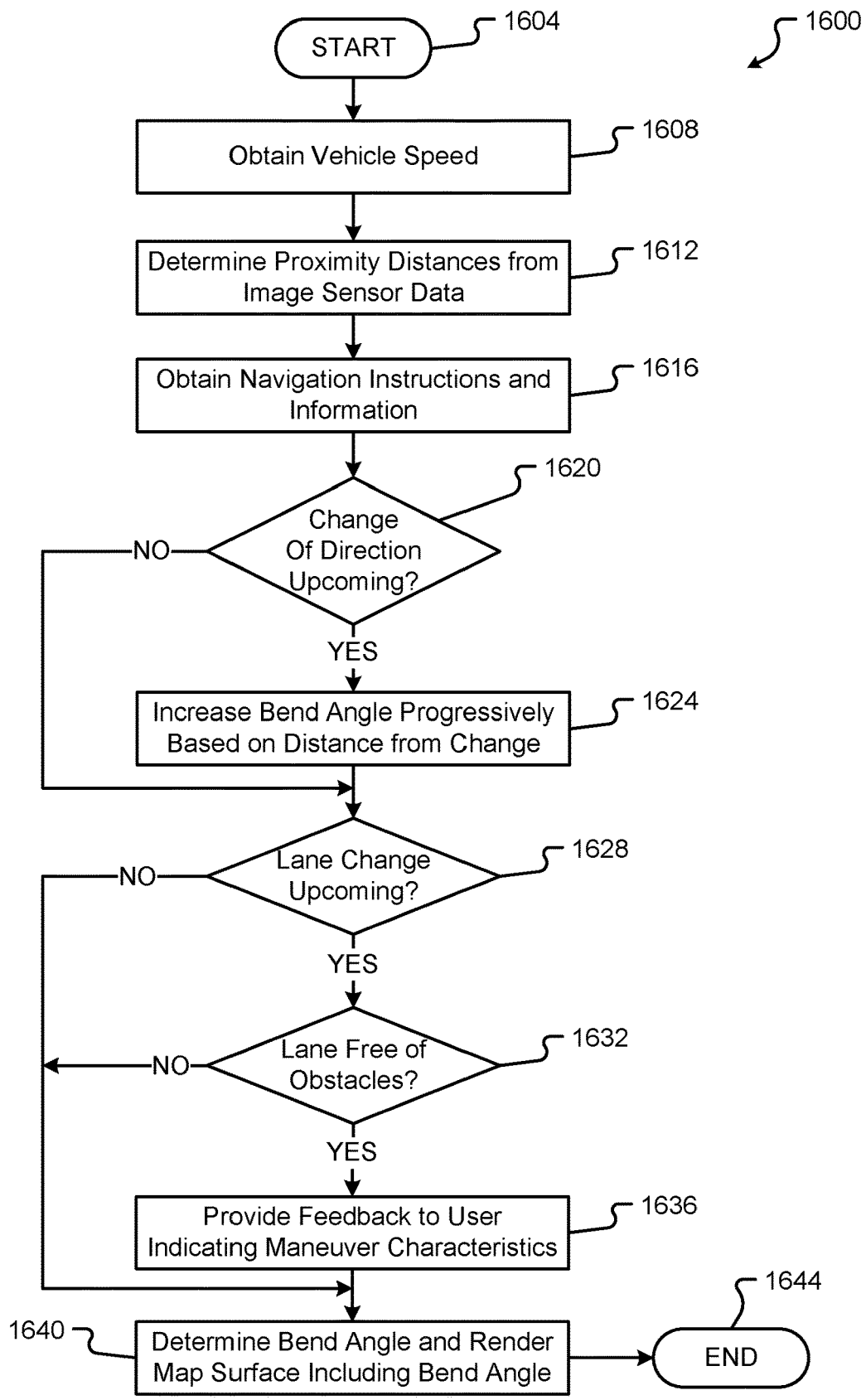
FIG. 16 is another flow diagram of a method for altering a display presentation of a map and information rendered to a display device in accordance with embodiments of the present disclosure.

An embodiment of a method 1600 for altering a display presentation of a map and information rendered to a display device may be as provided in FIG. 16. A general order for the steps of the method 1600 is shown in FIG. 16. Generally, the method 1600 starts with a start operation 1604 and ends with operation 1644. The method 1600 can include more or fewer steps or can arrange the order of the steps differently than those shown in FIG. 16. The method 1600 can be executed as a set of computer-executable instructions executed by a computer system or processor (e.g., driving and map integration engine 812, processor 708, etc.) and encoded or stored on a computer readable medium (e.g., control data 364, working memory 736, etc.). In other configurations, the method 1600 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1600 shall be explained with reference to the systems, components, circuits, modules, software, data structures, signaling processes, models, environments, conceptualizations, vehicles, flow diagrams, etc. described in conjunction with FIGS. 1-15.

The method 1600 begins at step 1604 and proceeds by obtaining the speed of the vehicle 100 (step 1608). In some embodiments, the vehicle speed may be obtained from a speedometer or other sensor of the vehicle 100. The vehicle speed may be obtained from calculating a velocity of the vehicle using information received from a GNSS (e.g., GPS, etc.) sensor/receiver measuring changes in the position of the vehicle 100 over time.

The driving and map integration engine 812 may determine the proximity and/or distances of one or more objects in an environment of the vehicle 100 based on data received from the vehicle sensors and systems 304 (step 1612). Among other things, this information may be used to render positions of objects in the environment 200 relative to the vehicle 100 over time.

In some embodiments, a trip may be planned, anticipated, and/or entered into the navigation system 302. The trip information, including navigation instructions and guidance, may be obtained by the driving and map integration engine 812 to determine any triggers associated with the presentation of the map display (step 1616). Guidance triggers may include any change in direction of travel, turns, traffic conditions, etc., and/or other information associated with a trip. The trip and/or guidance information may be retrieved from a data structure 956, as described in conjunction with FIG. 9C. In the event that a change of direction (e.g., a turn, etc.) is determined as approaching based on the trip and/or guidance information (step 1620), the method 1600 may continue by progressively increasing the bend angle of the map display (step 1624). This progressive increase may correspond to an increase in the size of the transition region 1028 associated with the map display 1004. As described herein, the upcoming turn or change of direction may be rendered in this expanded transition region 1028.

The method 1600 may proceed by the driving and map integration engine 812, or other processor 708, determining whether a lane change is required (step 1628). Changing lanes may be required as part of guidance information stored in data structure 956, and/or in response to determining a condition in the environment that requires the vehicle 100 to move from a current lane of travel to a target lane. For example, if a vehicle 100 is in an inside lane of a travel path and an exit, or turn, from the travel path is approaching, the guidance instructions may direct the vehicle 100 to change lanes to an outside lane before the vehicle 100 reaches the exit point. If the lane change is approaching, the method 1600 may continue by determining whether the target lane is free of obstacles and/or objects (step 1632). This determination may be made by the driving and map integration engine 812 interpreting and analyzing data received from the vehicle sensors and systems 304 regarding objects in the vehicle sensing environment 200. When the target lane in the environment 200 is free of other vehicles or objects, the driving and map integration engine 812 may cause a notification of the lane change to be rendered to the map display, display the lane change, and even maintain the bend angle of the map prior to the lane change to be presented to the map display (step 1636).

In the event that the target lane is not determined to be free of obstacles or objects, the driving and map integration engine 812 may determine an appropriate bend angle for the map presentation to the map display that shows the obstacle or object on a transition region 1028 of the map display (step 1640). The bend angle may be selected by the driving and map integration engine 812 to show the obstacle or object determined to be in the lane similar, if not identical, to the presentation illustrated in conjunction with FIG. 13C. In any event, the method 1600 may end at step 1644.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method, comprising: rendering, by a display device of a vehicle, a map display presentation at a first time including a map representing a geographical area surrounding the vehicle, the map disposed on a first viewing plane and a second viewing plane of a multiple-plane map surface, wherein the first viewing plane is disposed at a non-zero angle relative to the second viewing plane; and moving, as the vehicle moves in a physical environment at a second time, a portion of the map rendered to the second viewing plane at the first time in a direction toward and onto the first viewing plane at the second time while simultaneously moving a portion of the map rendered to the first viewing plane at the first time off the first viewing plane at the second time.

Aspects of the above method include wherein the first viewing plane and the second viewing plane are joined by a transition surface, and wherein prior to moving the portion of the map rendered to the second viewing plane onto the first viewing plane at the second time, the method further comprises: moving the portion of the map rendered to the second viewing plane at the first time onto the transition surface at a time after the first time, wherein map features rendered in the transition surface are displayed larger in size than when displayed in the second viewing plane of the multiple-plane map surface. Aspects of the above method include wherein the first viewing plane is visible in a first section of the display device, wherein the transition surface is visible in a second section of the display device disposed adjacent to and above the first section, and wherein the second viewing plane is visible in a third section of the display device disposed adjacent to and above the transition surface. Aspects of the above method include wherein the first viewing plane is rendered in perspective including a vanishing point disposed adjacent to the transition surface, wherein the second viewing plane is rendered substantially orthogonal to the first viewing plane, and wherein the transition surface is a curved surface joining the first viewing plane with the second viewing plane. Aspects of the above method further comprise: adjusting, via a user interface driver and in response to determining a travel condition for the vehicle and/or the physical environment, a viewing area size of the second section rendered to the display device and a corresponding size of the transition surface. Aspects of the above method include wherein the travel condition includes one or more of a trip guidance for the vehicle, object information of one or more objects in proximity to the vehicle, and/or a speed of the vehicle. Aspects of the above method further comprise: detecting, by sensors of the vehicle, information associated with an object in the physical environment surrounding the vehicle, wherein the object information includes a location of the object relative to the vehicle; receiving, from a navigation source and based at least partially on a geographical location of the vehicle, navigation instructions for the map; and rendering, to the display device of the vehicle, a representative image of the object overlaid on the map, wherein the location of the object relative to the vehicle is represented by a corresponding location of the representative image relative to a representative image of the vehicle on the map. Aspects of the above method further comprise: determining, based on the geographical location of the vehicle and the navigation instructions, whether a change of travel direction is upcoming; maintaining the viewing area size of the second section rendered to the display device and the size of the transition surface when no change of travel direction is upcoming; and increasing the viewing area size of the second section rendered to the display device and the size of the transition surface when the change of travel direction is upcoming. Aspects of the above method further comprise: determining, based on the geographical location of the vehicle and the navigation instructions, whether a change of lanes from a current lane the vehicle is in to a target lane for the vehicle is upcoming; determining, based on the object information received and when a change of lanes for the vehicle is determined as upcoming, whether the target lane for the vehicle is free of obstacles; rendering visual feedback regarding the change of lanes to the display device when the target lane is free of obstacles; and increasing the viewing area size of the second section rendered to the display device and the size of the transition surface when the target lane is not free of obstacles. Aspects of the above method include wherein the increasing the viewing area size of the second section rendered to the display device and the size of the transition surface includes decreasing one or more of a viewing area size of the first section rendered to the display device and/or a viewing area size of the third section rendered to the display device.

Embodiments include a method, comprising: detecting, by sensors of a vehicle, information associated with an object in a physical environment surrounding the vehicle, wherein the object information includes a location of the object relative to the vehicle; receiving, from a navigation source and based at least partially on a geographical location of the vehicle, map data including a map of the geographical location; and rendering, to a display device of the vehicle, a representative image of the object overlaid on the map, wherein the location of the object relative to the vehicle is represented by a corresponding location of the representative image relative to a representative image of the vehicle on the map.

Aspects of the above method further comprise: rendering, as the vehicle moves in the physical environment and/or as the object moves in the physical environment relative to the vehicle, the representative image of the object relative to the map and/or the representative image of the vehicle. Aspects of the above method further comprise: rendering, by the display device of the vehicle and at a first time, the map disposed on a first viewing plane and a second viewing plane of a multiple-plane map surface, wherein the first viewing plane is disposed at a non-zero angle relative to the second viewing plane; and moving, as the vehicle moves in the physical environment at a second time, a portion of the map rendered to the second viewing plane at the first time in a direction toward and onto the first viewing plane at the second time while simultaneously moving a portion of the map rendered to the first viewing plane at the first time off the first viewing plane at the second time. Aspects of the above method include wherein the first viewing plane and the second viewing plane are joined by a transition surface, and wherein prior to moving the portion of the map rendered to the second viewing plane onto the first viewing plane at the second time, the method further comprises: moving the portion of the map rendered to the second viewing plane at the first time onto the transition surface at a time after the first time, wherein map features rendered in the transition surface are displayed larger in size than when displayed in the second viewing plane of the multiple-plane map surface. Aspects of the above method include wherein the map features include one or more representative roads, paths, streets, and/or navigation routes.

Embodiments include a vehicle navigation system, comprising: a display device interface driver including instructions to control a display device of a vehicle; a processor; and a computer readable storage medium having instructions stored thereon that, when executed by the processor cause the processor to: render, via the display device interface driver, a map display presentation at a first time including a map representing a geographical area surrounding the vehicle, the map disposed on a first viewing plane and a second viewing plane of a multiple-plane map surface, wherein the first viewing plane is disposed at a non-zero angle relative to the second viewing plane; and move, as the vehicle moves in a physical environment at a second time, a portion of the map rendered to the second viewing plane at the first time in a direction toward and onto the first viewing plane at the second time while simultaneously moving a portion of the map rendered to the first viewing plane at the first time off the first viewing plane at the second time.

Aspects of the above vehicle navigation system include wherein the first viewing plane and the second viewing plane are joined by a transition surface, and wherein prior to moving the portion of the map rendered to the second viewing plane onto the first viewing plane at the second time, and wherein the instructions further cause the processor to: move the portion of the map rendered to the second viewing plane at the first time onto the transition surface at a time after the first time, wherein map features rendered in the transition surface are displayed larger in size than when displayed in the second viewing plane of the multiple-plane map surface. Aspects of the above vehicle navigation system include wherein the first viewing plane is visible in a first section of the display device, wherein the transition surface is visible in a second section of the display device disposed adjacent to and above the first section, and wherein the second viewing plane is visible in a third section of the display device disposed adjacent to and above the transition surface. Aspects of the above vehicle navigation system include wherein the first viewing plane is rendered in perspective including a vanishing point disposed adjacent to the transition surface, wherein the second viewing plane is rendered substantially orthogonal to the first viewing plane, and wherein the transition surface is a curved surface joining the first viewing plane with the second viewing plane. Aspects of the above vehicle navigation system include wherein the instructions further cause the processor to: receive, from sensors of the vehicle, information associated with an object detected in the physical environment surrounding the vehicle, wherein the object information includes a location of the object relative to the vehicle; receive, from a navigation source and based at least partially on a geographical location of the vehicle, navigation instructions for the map; render, to the display device of the vehicle, a representative image of the object overlaid on the map, wherein the location of the object relative to the vehicle is represented by a corresponding location of the representative image relative to a representative image of the vehicle on the map; determine, based on the geographical location of the vehicle and the navigation instructions, whether a change of travel direction is upcoming; maintain the viewing area size of the second section rendered to the display device and the size of the transition surface when no change of travel direction is upcoming; increase the viewing area size of the second section rendered to the display device and the size of the transition surface when the change of travel direction is upcoming; determine, based on the geographical location of the vehicle and the navigation instructions, whether a change of lanes from a current lane the vehicle is in to a target lane for the vehicle is upcoming; determine, based on the object information received and when a change of lanes for the vehicle is determined as upcoming, whether the target lane for the vehicle is free of obstacles; render visual feedback regarding the change of lanes to the display device when the target lane is free of obstacles; and increase the viewing area size of the second section rendered to the display device and the size of the transition surface when the target lane is not free of obstacles.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method, comprising:
    rendering, by a display device of a vehicle, a map display presentation at a first time including a map representing a geographical area surrounding the vehicle, the map disposed on a first viewing plane and a second viewing plane of a multiple-plane map surface, wherein the first viewing plane is disposed at a non-zero angle relative to the second viewing plane, wherein the first viewing plane and the second viewing plane are joined by a transition surface, wherein the first viewing plane is visible in a first section of the display device, wherein the transition surface is visible in a second section of the display device disposed adjacent to and above the first section, and wherein the second viewing plane is visible in a third section of the display device disposed adjacent to and above the transition surface; and
    moving, as the vehicle moves in a physical environment at a second time, a portion of the map rendered to the second viewing plane at the first time in a direction toward and onto the first viewing plane at the second time while simultaneously moving a portion of the map rendered to the first viewing plane at the first time off the first viewing plane at the second time.

2. The method of claim 1, wherein prior to moving the portion of the map rendered to the second viewing plane onto the first viewing plane at the second time, the method further comprises:
    moving the portion of the map rendered to the second viewing plane at the first time onto the transition surface at a time after the first time.

3. The method of claim 2, wherein map features rendered in the transition surface are displayed larger in size than when displayed in the second viewing plane of the multiple-plane map surface.

4. The method of claim 3, wherein the first viewing plane is rendered in a perspective view arrangement including a vanishing point disposed adjacent to the transition surface, wherein the second viewing plane is rendered substantially orthogonal to the first viewing plane, and wherein the transition surface is a curved surface joining the first viewing plane with the second viewing plane.

5. The method of claim 4, further comprising:
adjusting, via a user interface driver and in response to determining a travel condition for the vehicle and/or the physical environment, a viewing area size of the second section rendered to the display device and a corresponding size of the transition surface.

6. The method of claim 5, wherein the travel condition includes one or more of a trip guidance for the vehicle, object information of one or more objects in proximity to the vehicle, and/or a speed of the vehicle.

7. The method of claim 6, further comprising:
detecting, by sensors of the vehicle, information associated with an object in the physical environment surrounding the vehicle, wherein the detected object information includes a location of the object relative to the vehicle;
receiving, from a navigation source and based at least partially on a geographical location of the vehicle, navigation instructions for the map; and
rendering, to the display device of the vehicle, a representative image of the object overlaid on the map, wherein the location of the object relative to the vehicle is represented by a corresponding location of the representative image of the object relative to a representative image of the vehicle on the map.

8. The method of claim 7, further comprising:
determining, based on the geographical location of the vehicle and the navigation instructions, whether a change of a travel direction is upcoming;
maintaining the viewing area size of the second section rendered to the display device and the corresponding size of the transition surface when no change of the travel direction is upcoming; and
increasing the viewing area size of the second section rendered to the display device and the corresponding size of the transition surface when the change of the travel direction is upcoming.

9. The method of claim 8, further comprising:
determining, based on the geographical location of the vehicle and the navigation instructions, whether a change of lanes from a current lane the vehicle is in to a target lane for the vehicle is upcoming;
determining, based on the detected object information and when the change of lanes for the vehicle is determined as upcoming, whether the target lane for the vehicle is free of obstacles;
rendering visual feedback regarding the change of lanes to the display device when the target lane is free of obstacles; and
increasing the viewing area size of the second section rendered to the display device and the corresponding size of the transition surface when the target lane is not free of obstacles.

10. The method of claim 9, wherein the increasing the viewing area size of the second section rendered to the display device and the corresponding size of the transition surface includes decreasing one or more of a viewing area size of the first section rendered to the display device and/or a viewing area size of the third section rendered to the display device.

11. A vehicle navigation system, comprising:
a display device interface driver including instructions to control a display device of a vehicle;
a processor; and
a computer readable storage medium having instructions stored thereon that, when executed by the processor cause the processor to:
render, via the display device interface driver, a map display presentation at a first time including a map representing a geographical area surrounding the vehicle, the map disposed on a first viewing plane and a second viewing plane of a multiple-plane map surface, wherein the first viewing plane is disposed at a non-zero angle relative to the second viewing plane, wherein the first viewing plane and the second viewing plane are joined by a transition surface, wherein the first viewing plane is visible in a first section of the display device, wherein the transition surface is visible in a second section of the display device disposed adjacent to and above the first section, and wherein the second viewing plane is visible in a third section of the display device disposed adjacent to and above the transition surface; and
move, as the vehicle moves in a physical environment at a second time, a portion of the map rendered to the second viewing plane at the first time in a direction toward and onto the first viewing plane at the second time while simultaneously moving a portion of the map rendered to the first viewing plane at the first time off the first viewing plane at the second time.

12. The vehicle navigation system of claim 11, wherein prior to moving the portion of the map rendered to the second viewing plane onto the first viewing plane at the second time, the instructions further cause the processor to:
move the portion of the map rendered to the second viewing plane at the first time onto the transition surface at a time after the first time.

13. The vehicle navigation system of claim 12, wherein map features rendered in the transition surface are displayed larger in size than when displayed in the second viewing plane of the multiple-plane map surface.

14. The vehicle navigation system of claim 13, wherein the first viewing plane is rendered in a perspective view arrangement including a vanishing point disposed adjacent to the transition surface, wherein the second viewing plane is rendered substantially orthogonal to the first viewing plane, and wherein the transition surface is a curved surface joining the first viewing plane with the second viewing plane.

15. The vehicle navigation system of claim 14, wherein the instructions further cause the processor to:
receive, from sensors of the vehicle, information associated with an object detected in the physical environment surrounding the vehicle, wherein the received object information includes a location of the object relative to the vehicle;
receive, from a navigation source and based at least partially on a geographical location of the vehicle, navigation instructions for the map;
render, to the display device of the vehicle, a representative image of the object overlaid on the map, wherein the location of the object relative to the vehicle is represented by a corresponding location of the representative image of the object relative to a representative image of the vehicle on the map;
determine, based on the geographical location of the vehicle and the navigation instructions, whether a change of a travel direction is upcoming;
maintain a viewing area size of the second section rendered to the display device and the a size of the transition surface when no change of the travel direction is upcoming;

increase the viewing area size of the second section rendered to the display device and the size of the transition surface when the change of the travel direction is upcoming;

determine, based on the geographical location of the vehicle and the navigation instructions, whether a change of lanes from a current lane the vehicle is in to a target lane for the vehicle is upcoming;

determine, based on the received object information and when the change of lanes for the vehicle is determined as upcoming, whether the target lane for the vehicle is free of obstacles;

render visual feedback regarding the change of lanes to the display device when the target lane is free of obstacles; and increase the viewing area size of the second section rendered to the display device and the size of the transition surface when the target lane is not free of obstacles.

\* \* \* \* \*